US012726382B2

(12) United States Patent
Sun et al.

(10) Patent No.: US 12,726,382 B2
(45) Date of Patent: Sep. 1, 2026

(54) BACKSCATTER LINK CHANNEL ESTIMATION WITH PSD LIMITATION

(71) Applicant: QUALCOMM Incorporated, San Diego, CA (US)

(72) Inventors: Jing Sun, San Diego, CA (US); Raviteja Patchava, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 18/190,924

(22) Filed: Mar. 27, 2023

(65) Prior Publication Data

US 2024/0333556 A1 Oct. 3, 2024

(51) Int. Cl.
*H04L 25/02* (2006.01)
*G06K 7/00* (2006.01)
*H04J 13/00* (2011.01)
*H04L 5/00* (2006.01)

(52) U.S. Cl.
CPC ........ *H04L 25/0202* (2013.01); *G06K 7/0008* (2013.01); *H04J 13/0062* (2013.01); *H04L 5/0007* (2013.01)

(58) Field of Classification Search
CPC . H04L 25/0202; H04L 5/0007; G06K 7/0008; H04J 13/0062
See application file for complete search history.

(56) References Cited

U.S. PATENT DOCUMENTS

2020/0412591 A1* 12/2020 Lopez ...................... H04B 5/45
2024/0146408 A1* 5/2024 Herath ...................... H04J 11/00
2024/0179494 A1* 5/2024 Säily ...................... H04W 4/029
2024/0313870 A1* 9/2024 Li ............................ H04B 7/22
2024/0349229 A1* 10/2024 Jiang ....................... G01S 7/006
2025/0287345 A1* 9/2025 Cui ........................ H04W 64/00

* cited by examiner

*Primary Examiner* — Sharmin Chowdhury

(74) *Attorney, Agent, or Firm* — Procopio, Cory, Hargreaves & Savitch LLP/Qualcomm

(57) ABSTRACT

A method for wireless communication at a user equipment (UE) and related apparatus are provided. In the method, the UE receives, from a first reader device, multiple continuous wave (CW) signal sets. Each CW signal set of the multiple CW signal sets includes at least one CW signal. The UE further generates a set of reference signals corresponding to CW signals in the multiple CW signal sets, where the set of reference signals is generated based on at least one of a frequency spread or a frequency shift on the CW signals in the multiple CW signal sets. The UE further transmits, to the first reader device or a second reader device different from the first reader device, the set of reference signals corresponding to the multiple CW signal sets. The method allows for improved channel estimation while adhering to the power spectrum density (PSD) limitations.

27 Claims, 16 Drawing Sheets

200
One Frame (TDD)
10 ms
subframe
RB
slot
D D D D D D D D D D D D F U
subcarrier
OFDM symbol
DMRS R
CSI-RS 230
PDCCH CORESET
SSS
PSS
PDSCH
PBCH
REG
12 REs
1 CCE = 6 REGs
SS/PBCH Block
BWP
20 RBs
channel bandwidth RBs 250
U U U U U U U U U U U U U U
SRS
SRS Comb 0
SRS Comb 1

280
PUCCH
PUSCH

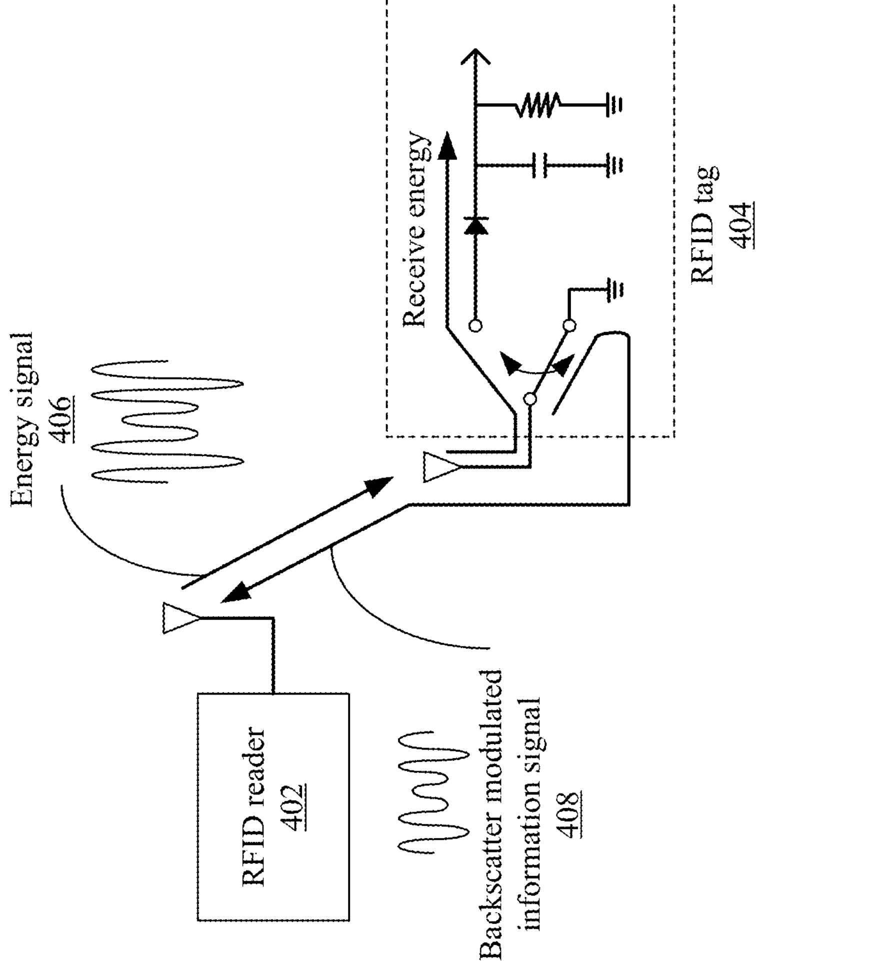
FIG. 4

BACKSCATTER LINK CHANNEL ESTIMATION WITH PSD LIMITATION

TECHNICAL FIELD

The present disclosure relates generally to communication systems, and more particularly, to backscatter link channel estimation with power spectrum density (PSD) limitation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory. Based at least in part on information stored in the memory, the at least one processor may be configured to receive, from a first reader device, multiple continuous wave (CW) signal sets, where each CW signal set of the multiple CW signal sets includes at least one CW signal; generate a set of reference signals corresponding to CW signals in the multiple CW signal sets, where the set of reference signals is generated based on at least one of a frequency spread or a frequency shift on the CW signals in the multiple CW signal sets; and transmit, to the first reader device or a second reader device different from the first reader device, the set of reference signals corresponding to the multiple CW signal sets for a measurement of a channel between the UE and the first reader device or between the UE and the second reader device.

In an aspect of the disclosure, a method, a computer-readable medium, and an apparatus are provided for wireless communication at a network entity. The apparatus may include memory and at least one processor coupled to the memory. Based at least in part on information stored in the memory, the at least one processor may be configured to transmit, to a UE, multiple CW signal sets, where each CW signal set of the multiple CW signal sets includes at least one CW signal; receive, from the UE, a set of reference signals corresponding to CW signals in the multiple CW signal sets, where the set of reference signals is obtained based on at least one of a frequency spread or a frequency shift on the CW signals in the multiple CW signal sets; and measure, based on the set of reference signals, a channel between the UE and the network entity.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating an example passive Radio Frequency Identification (RFID) system.

DETAILED DESCRIPTION

Figure 1:
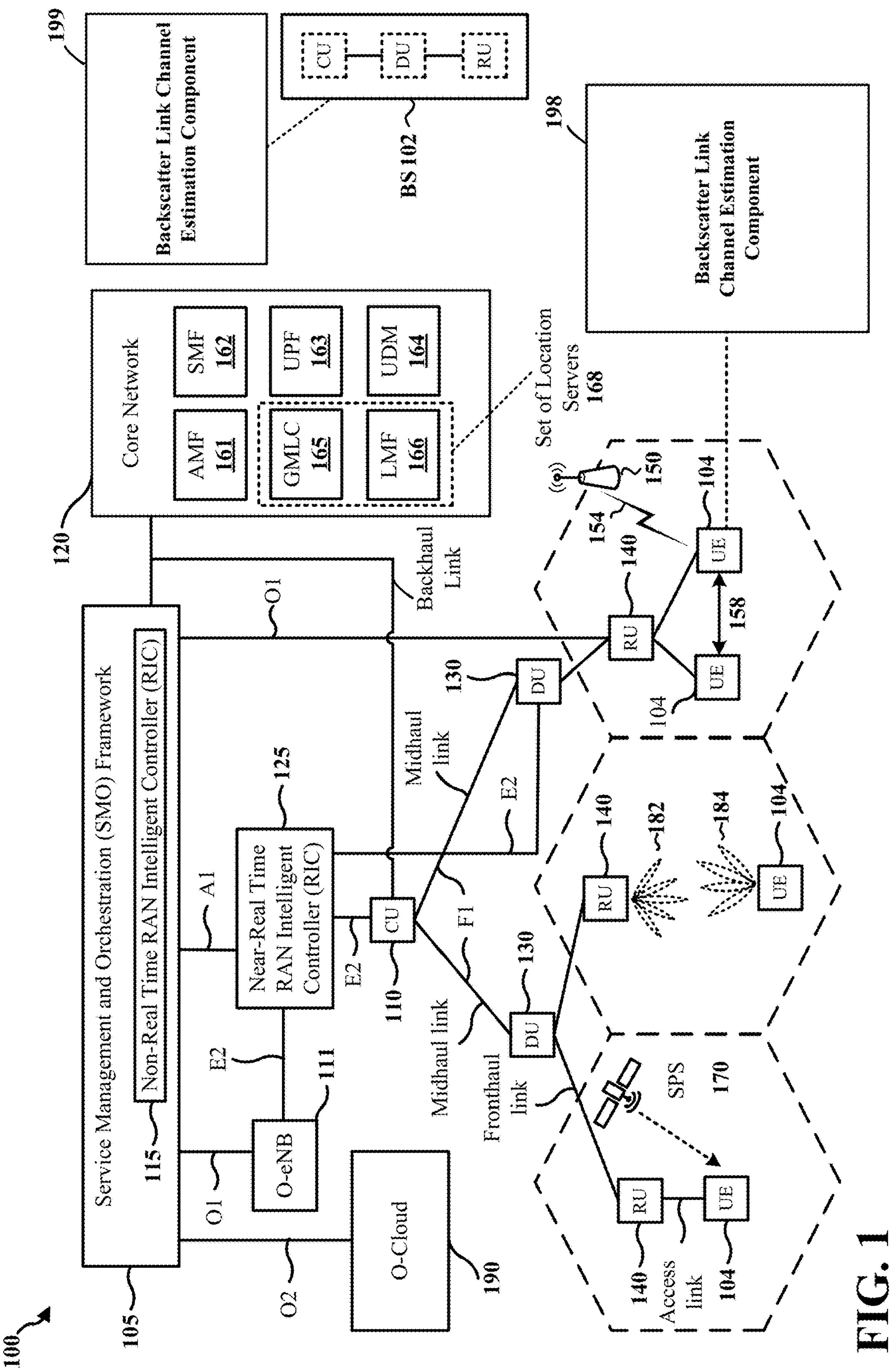
FIG. 1 is a diagram illustrating an example of a wireless communication system and an access network.

RFID (Radio Frequency Identification) is a wireless technology that uses small transponders or tags to emit an information-bearing signal upon receiving a signal, enabling various applications such as inventory and asset management inside and outside warehouses, Internet of Things (IoT) applications, sustainable sensor networks, and smart homes. One of the key challenges for RFID systems is the limitation on channel sensing due to PSD (Power Spectral Density) limitation. The sensing energy is provided by a single tone sent from the reader, and the tag spreads the signal to generate a response signal (RS) for channel estimation. However, PSD limitations can restrict the total channel sensing energy, leading to degraded channel estimation quality.

Various aspects relate generally to communication systems. Some aspects more specifically relate to backscatter link channel estimation with PSD limitation. In some examples, a UE may receive, from a first reader device, multiple CW signal sets. Each CW signal set of the multiple CW signal sets may include at least one CW signal. The UE may further generate a set of reference signals corresponding to CW signals in the multiple CW signal sets based on at least one of a frequency spread or a frequency shift on the CW signals in the multiple CW signal sets; and transmit, to the first reader device or a second reader device different from the first reader device, the set of reference signals corresponding to the multiple CW signal sets for a measurement of a channel between the UE and the first reader device or between the UE and the second reader device. In some aspects, the multiple CW signal sets may include multiple single tones or a comb-like waveform with overlapping frequencies to cover the full bandwidth of interest. By jointly processing the received signals from different frequencies, the reader may estimate the Forward Link (FL) and Backscatter (BS) channels.

Particular aspects of the subject matter described in this disclosure can be implemented to realize one or more of the following potential advantages. In some examples, by transmitting multiple CW signal sets from the reader and having the UE (e.g., the tag) spread the signal sets with a sequence or frequency shift, the response signals can be used to estimate the FL and BS channels, even in the presence of PSD limitations. Additionally, the method of sending multiple single tones or a comb-like waveform with overlapping frequencies enables the reader to cover the full bandwidth of interest, improving the accuracy of the channel estimation. Overall, the described techniques can be used to enhance the performance and effectiveness of RFID systems in various applications.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements.

For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a backscatter link channel estimation component 198. The backscatter link channel estimation component 198 may be configured to receive, from a first reader device, multiple CW signal sets, where each CW signal set of the multiple CW signal sets includes at least one CW signal; generate a set of reference signals corresponding to CW signals in the multiple CW signal sets, where the set of reference signals is generated based on at least one of a frequency spread or a frequency shift on the CW signals in the multiple CW signal sets; and transmit, to the first reader device or a second reader device different from the first reader device, the set of reference signals corresponding to the multiple CW signal sets for a measurement of a channel between the UE and the first reader device or between the UE and the second reader device. In certain aspects, the base station 102 may include a backscatter link channel estimation component 199. The backscatter link channel estimation component 199 may be configured to transmit, to a UE, multiple CW signal sets, where each CW signal set of the multiple CW signal sets includes at least one CW signal; receive, from the UE, a set of reference signals corresponding to CW signals in the multiple CW signal sets, where the set of reference signals is obtained based on at least one of a frequency spread or a frequency shift on the CW signals in the multiple CW signal sets; and measure, based on the set of reference signals, a channel between the UE and the network entity. Although the following description may be focused on 5G NR, the concepts described herein may be applicable to other similar areas, such as LTE, LTE-A, CDMA, GSM, and other wireless technologies.

Figures 2A, 2B, 2C, 2D:
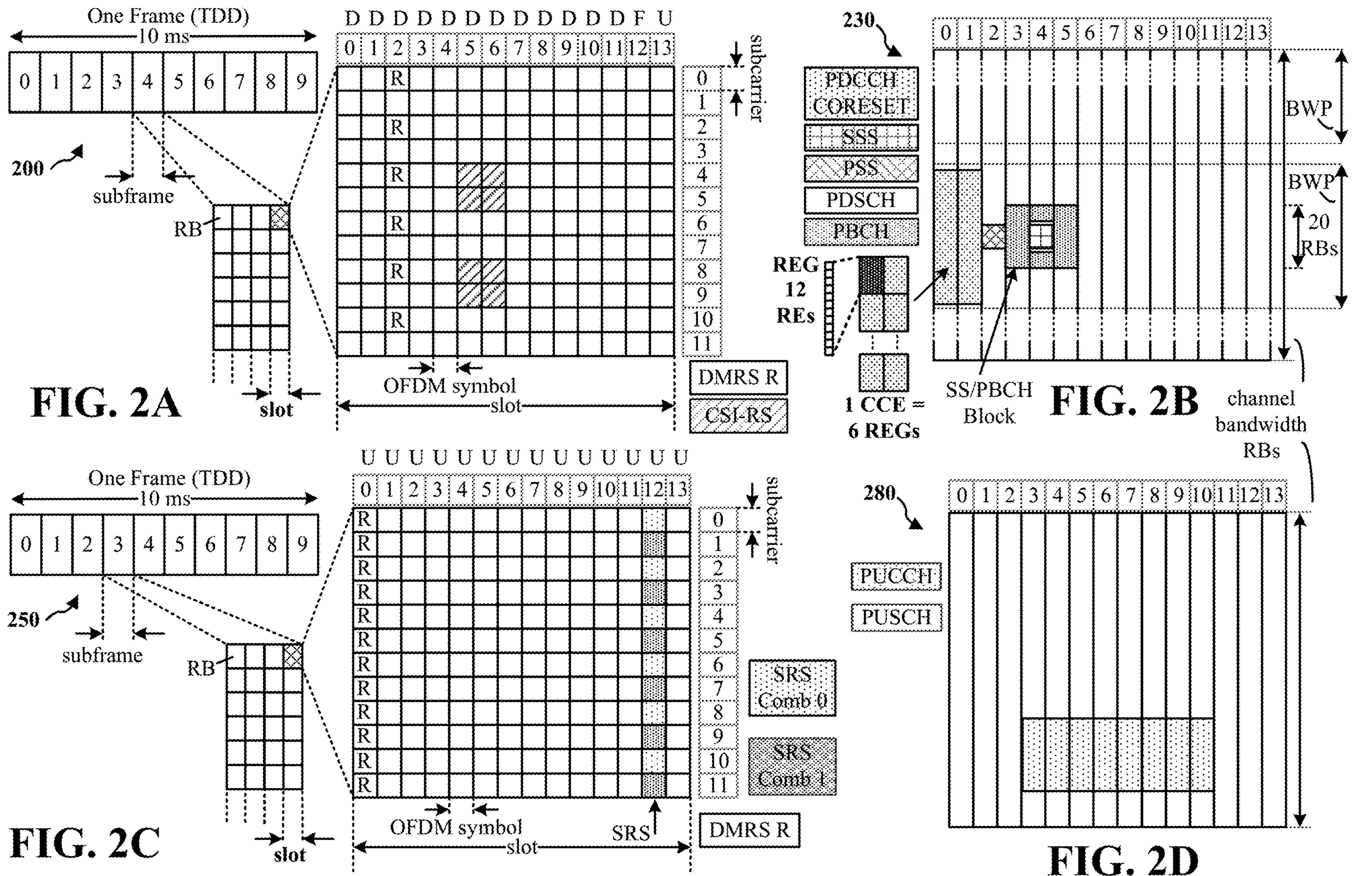
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
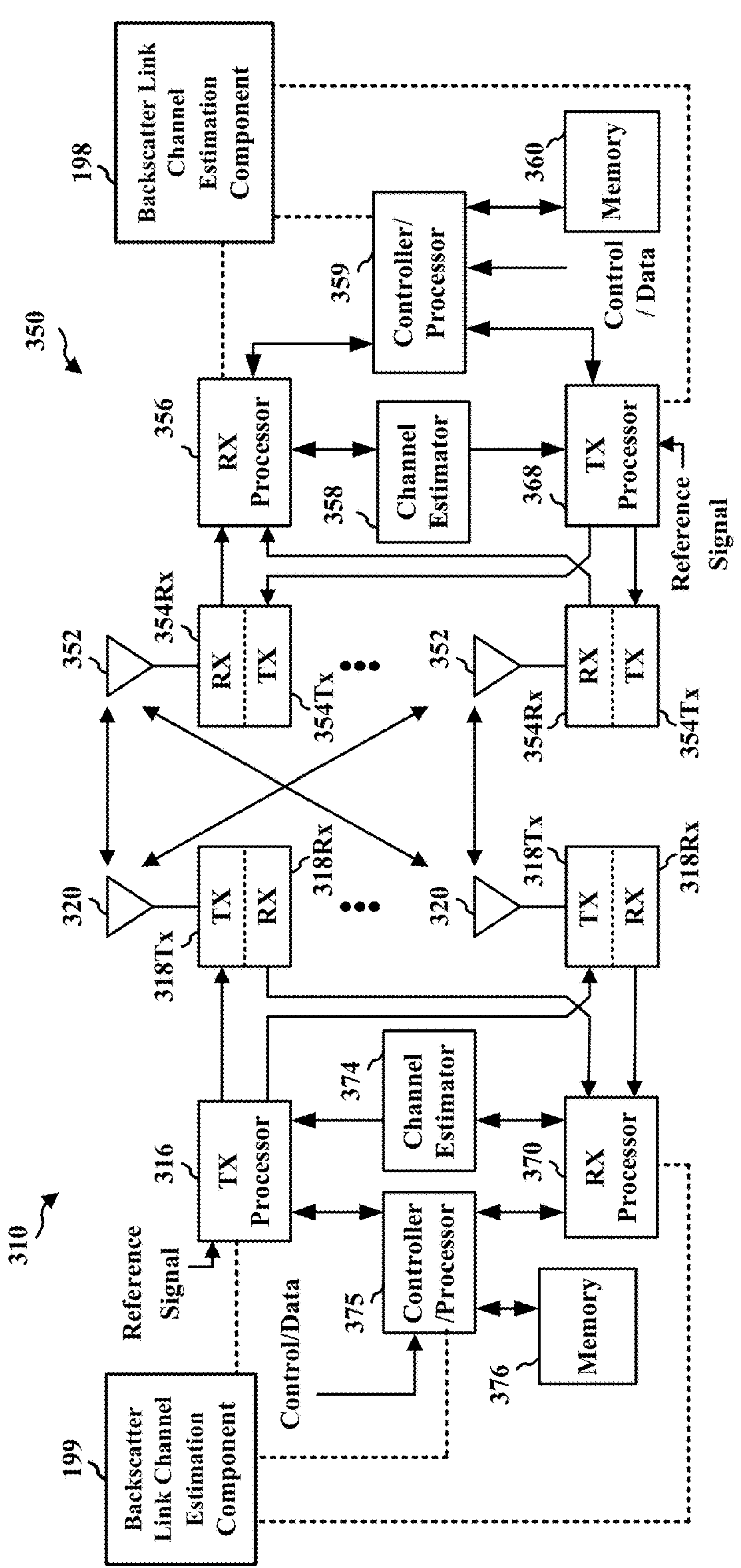
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the backscatter link channel estimation component 198 of FIG. 1.

At least one of the TX processor 316, the RX processor 370, and the controller/processor 375 may be configured to perform aspects in connection with the backscatter link channel estimation component 199 of FIG. 1.

RFID is a rapidly growing technology that has recently gained significant attention due to its potential to transform various industries, including inventory and asset management, IoT applications, sustainable sensor networks in factories and agriculture, and smart home systems.

At the core of RFID technology are small transponders, or tags, which emit information-bearing signals when activated by an external signal. These tags can be utilized to track, identify, and manage a wide range of objects and assets. One of the key benefits of RFID technology is its ability to function at low operating expenses (OPEX), low maintenance costs, and a long lifecycle.

Passive RFID systems, in particular, may harvest energy from ambient radio frequency waves and power the transmission and reception circuitry without the need for an internal battery. These systems typically employ backscatter modulation for the transmitted signal, enabling the tags to operate with minimal power consumption. Besides passive RFID systems, semi-passive or active RFID systems may incorporate batteries to provide additional power and extended capabilities. However, these systems generally entail a higher cost. FIG. 4 is a diagram 400 illustrating an example passive RFID system. In FIG. 4, an RFID reader 402 (an electronic device that can communicate with an RFID tag and retrieve the information stored on it) may transmit an energy signal 406 to the RFID tag 404. The RFID tag 404 may reflect a backscatter modulated information signal 408 back to the RFID reader 402. This backscatter modulated information signal 408 may carry data that the RFID reader 402 may use for various purposes, such as identification verification and tracking.

RFID technology, while offering numerous advantages for a wide range of applications, is currently limited by its short-range capabilities. Passive IoT systems, for example, typically have a maximum range of less than 10 meters due to the insufficient link budget. This limitation can be attributed to the bottleneck link in the system, which is the downlink (DL) between the reader and the tag. For example, the power harvesting circuitry, which may utilize a relatively high input power, such as −13 dBm, to function effectively. When the input power is lower, at around −20 dBm or below, the cost and conversion efficiency of the system may become unsatisfactory (e.g., the conversion efficiency can fall below 1%). Additionally, multi-path reflections may cause fading to the energy signal, further degrading the range of the RFID system. These reflections occur when radio frequency signals travel through multiple paths, resulting in interference and reduced signal strength.

To address these challenges and improve the performance of RFID systems, aspects presented herein may utilize novel solutions and technologies.

Enhancing energy transfer efficiency and coverage in RFID systems can be achieved by obtaining Channel State Information (CSI) at the reader. The channel for the forward link (FL) channel and backscatter (BS) channel may be estimated separately for backscatter-based communications. For example, a reader may send a single-tone signal, which is then scrambled by the tag using a frequency shift to generate a reference signal (RS) for sensing the tag-to-reader channel. This procedure can be performed in both directions to sense the FL channel and BS channel separately, and this procedure is applicable to both monostatic and bistatic cases. For the monostatic case, a frequency shift may be employed to ensure that the FL and BS channels are distinct, allowing for accurate channel estimation. In the bistatic case, separate devices for transmission and reception can be utilized, further enhancing the accuracy and reliability of the channel estimation process.

Figures 5A, 5B:
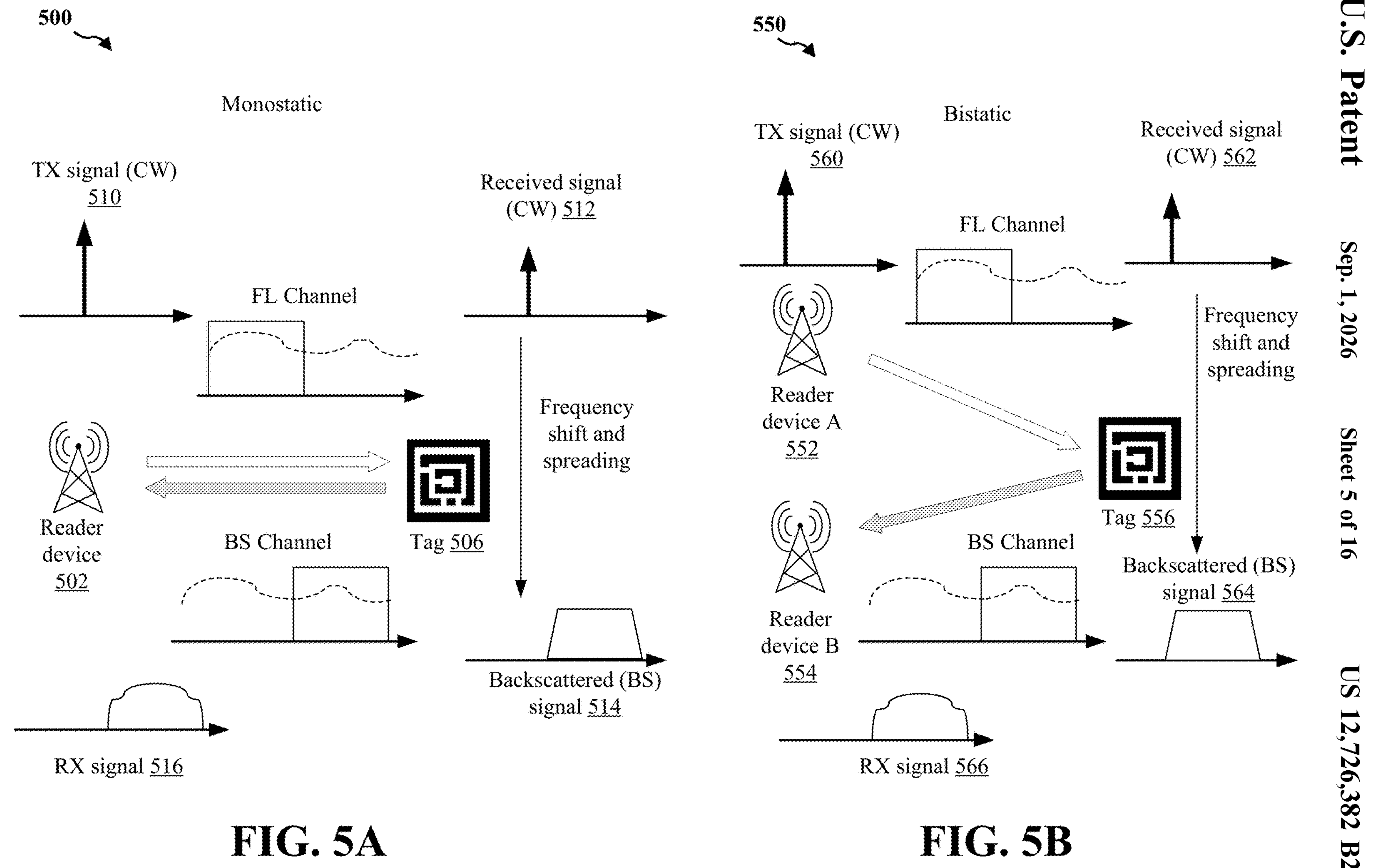
FIG. 5A is a diagram illustrating an example monostatic channel estimation for an RFID reader.
FIG. 5B is a diagram illustrating an example bistatic channel estimation for an RFID reader.

FIG. 5A is a diagram 500 illustrating an example monostatic channel estimation for an RFID reader. FIG. 5B is a diagram 550 illustrating an example bistatic channel estimation for an RFID reader. In FIG. 5A, a reader device 502 may transmit a TX signal 510 to an RFID tag 506. The TX signal 510 may be a continuous wave (CW) signal and may cover a first frequency band in the frequency domain. When the RFID tag 506 receives the received signal 512, the RFID tag 506 may apply frequency shift and spread to the received signal 512. As a result, the backscattered (BS) signal 514, which the RFID tag 506 sends back to the reader device 502, may have a spread and shifted frequency band when compared to the received signal 512. The reader device 502 then may estimate the channel between itself and the RFID tag 506 based on the receive (RX) signal 516. In FIG. 5B, a reader device 552 may transmit a CW TX signal 560 to an RFID tag 556. The CW TX signal 560 may cover a first frequency band in the frequency domain. Similarly, when the RFID tag 556 receives the received signal 562, the RFID tag 556 may apply frequency shift and spread to the received signal 562, resulting in a spread and shifted frequency band for the backscattered (BS) signal 564, which the RFID tag 556 sends to reader device 554. The reader device 554 may estimate the channel between itself and the RFID tag 506 based on the receive (RX) signal 566.

In some examples, estimating the FL and BS channels in RFID systems may include the reader's transmitter (TX) sending a continuous wave (CW) signal. However, this approach may pose challenges when dealing with power spectral density (PSD) limitations in certain operating bands. For example, in an unlicensed band with a 13 dBm/MHz PSD limitation, enforcing single-tone transmission for channel sensing effectively restricts the total transmit power from the reader.

Example aspects presented herein provide three innovative schemes to address the PSD limitation issue while maintaining efficient channel estimation in RFID systems. By overcoming these limitations, the performance of RFID systems can be enhanced, enabling them to operate more effectively in various environments and frequency bands subject to PSD restrictions. The strategies incorporate frequency shifts on top of the frequency domain spreading. In certain instances, frequency spreading may be entirely replaced by frequency shifting, offering a flexible solution to overcome PSD limitations. As used herein, "frequency shift" refers to a process of changing the frequency of a signal (e.g., moving a signal from one frequency band to another), and "frequency spread." or "frequency spreading." refers to a process of distributing the energy of a signal over a wider frequency range.

In the channel estimation process with a single-tone source, the sensing energy is provided by the single tone. When facing PSD limitations, the total channel sensing energy is effectively limited. As the tag spreads the signal to generate an RS, the wider the spread, the more the channel sensing energy is distributed across the receiver's bandwidth. However, if the per-unit bandwidth sensing energy is too low in the RS, the channel estimation quality may degrade. Hence, narrower spread by the tag may be used when the sensing energy is low, either due to PSD limitations of the transmitter or increased distance and path loss. Consequently, if the spread bandwidth is narrow and insufficient to cover the entire band of interest, multiple measurements of narrower bands may be used to sweep the frequency offset and cover the wider band.

This approach allows for improved channel estimation while adhering to the PSD limitations and overcoming the challenges posed by distance and path loss. By utilizing multiple measurements of narrow bands and adjusting the spread bandwidth accordingly, RFID systems can achieve more accurate channel estimations, leading to enhanced performance in various operating conditions.

In some aspects, the reader may transmit a CW signal while the tag spreads the CW signal by applying a sequence and sweeping it with different frequency shifts to cover a wider band to achieve the channel estimation. As used herein, a "continuous wave signal," or "CW signal," refers to a signal with constant amplitude and frequency without any variation (e.g., a sinusoidal signal with constant amplitude and frequency).

To achieve the best channel estimation, the spread in the frequency domain may be uniform. For example, uniform spread may be attained by using a Zadoff-Chu (ZC) sequence in the time domain. Moreover, the bandwidth over which the tag spreads the signal may depend on the PSD limitations. The sequence may be applied using a programmable backscatter modulator with distinct loads, with the number of loads determining the modulation order that can be generated. While a higher modulation order may create a sequence closer to the ZC sequence, it increases the tag's cost and power consumption.

In some aspects, the tag may indicate to the reader its modulation order, frequency shift, and frequency spread capability, which may include the distinct frequency shifts supported and the distinct number of bandwidths it can spread. Based on the PSD and tag information, the reader may decide the number of CW transmissions (the transmissions of CW signals) and the frequency shift and frequency spread for each transmission to cover the full bandwidth and communicates this information to the tag.

In consecutive transmissions, the reader may use the same frequency shift and frequency spread to improve the channel estimation signal-to-noise ratio (SNR) at the reader by receiving multiple backscattered signals. This collaborative approach between the reader and tag enables more accurate channel estimation.

Figure 6:
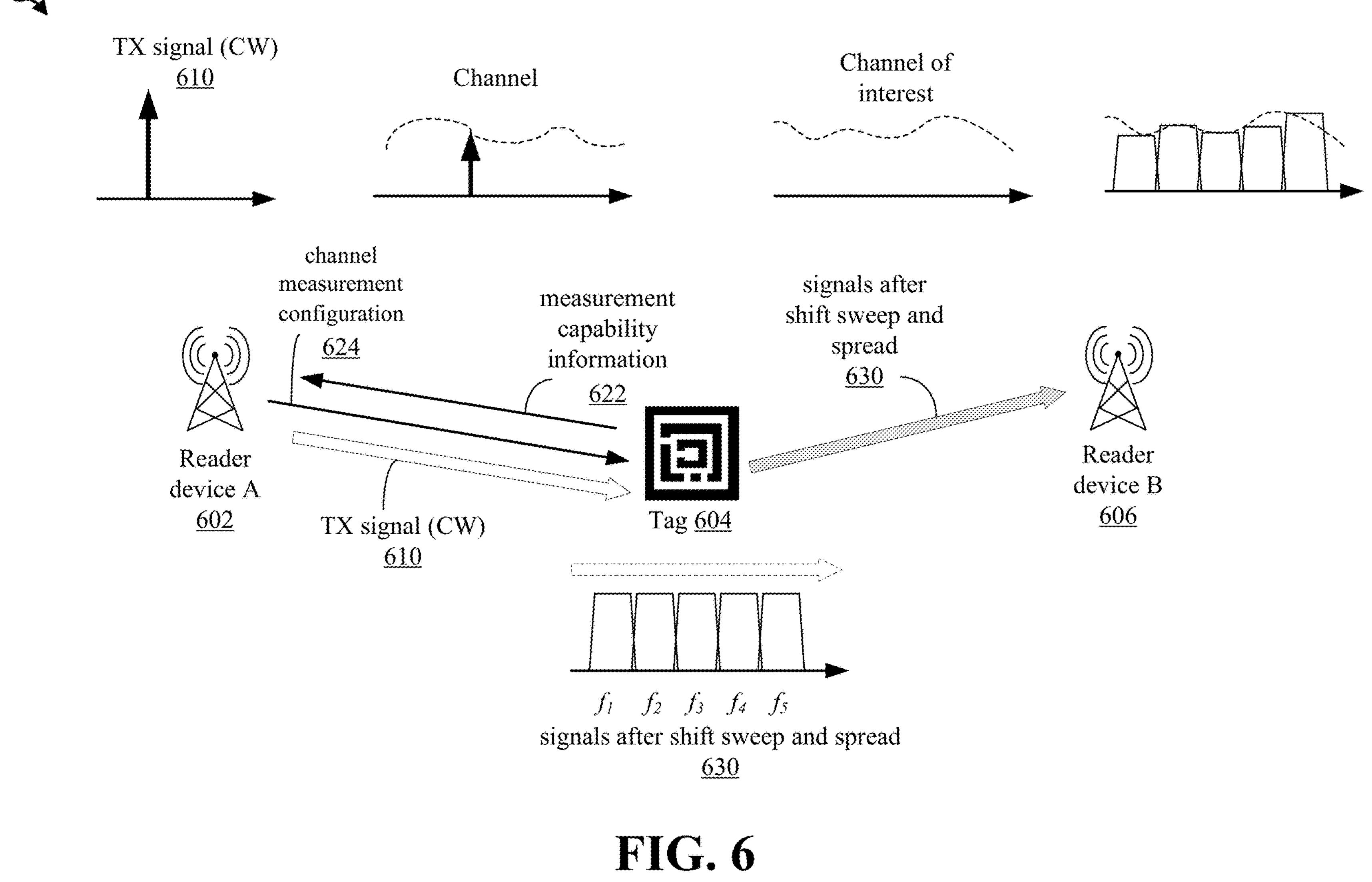
FIG. 6 is a diagram illustrating an example of frequency shift sweeping for an RFID tag in accordance with various aspects of the present disclosure.

FIG. 6 is a diagram 600 illustrating an example of frequency shift sweeping for an RFID tag in accordance with various aspects of the present disclosure. In FIG. 6, an RFID tag 604 may transmit measurement capability information 622 to a reader device A 602. The measurement capability information may include, for example, the modulation order related to the frequency spread, the frequency shift capability of the tag 604, and the frequency spread capability of the tag 604. At 624, the reader device A 602 may transmit to the tag 604 a channel measurement configuration. The channel measurement configuration may include a frequency shift amount and a frequency spread amount for each of the multiple CW signals to be sent to the tag 604. Then, the reader device A 602 may transmit a CW TX signal 610 to the RFID tag 604. The TX signal 610 may cover a first frequency band in the frequency domain. Upon receiving the signal from reader device A 602, the RFID tag 604 may apply frequency shift and spread to the signal. The tag 604 may also sweep the frequency shift amount so that the signals it sends to the reader device B 606 cover the desired frequency range for the channel of interest (e.g., the channel between the tag 604 and reader device B 606). For example, the tag 604 may apply a frequency spread to the signal from reader device A 602 and shifts the signal to various positions ($f_1$, $f_2$, . . . , $f_5$) in the frequency domain. The tag 604 then transmits these spread and shifted signals 630 to reader device B 606. Reader device B 606 may then estimate the channel between itself and the tag 604 based on the received signals.

In some aspects, the reader may send multiple single tones to the tag. Under PSD limitations, each single tone may be subject to the PSD constraint, and transmitting more tones enables higher power to be sent. The tag then may spread the signal with a narrowband signal, where the bandwidth of the signal is no larger than the spacing between the single tones. However, this approach presents a challenge in estimating the channel at the reader. The received signal at the reader, in this case, may have different forward channel gains due to the multiple transmit CW frequencies. As a result, the estimation of the channel may not be possible because the forward channel gains differ for each frequency (e.g., $H_{f,0} \neq H_{f,1}$, where $H_{f,0}$ and $H_{f,1}$ are the forward channel gains for the signals associated with frequencies $f_0$ and $f_1$, respectively).

Figure 7:
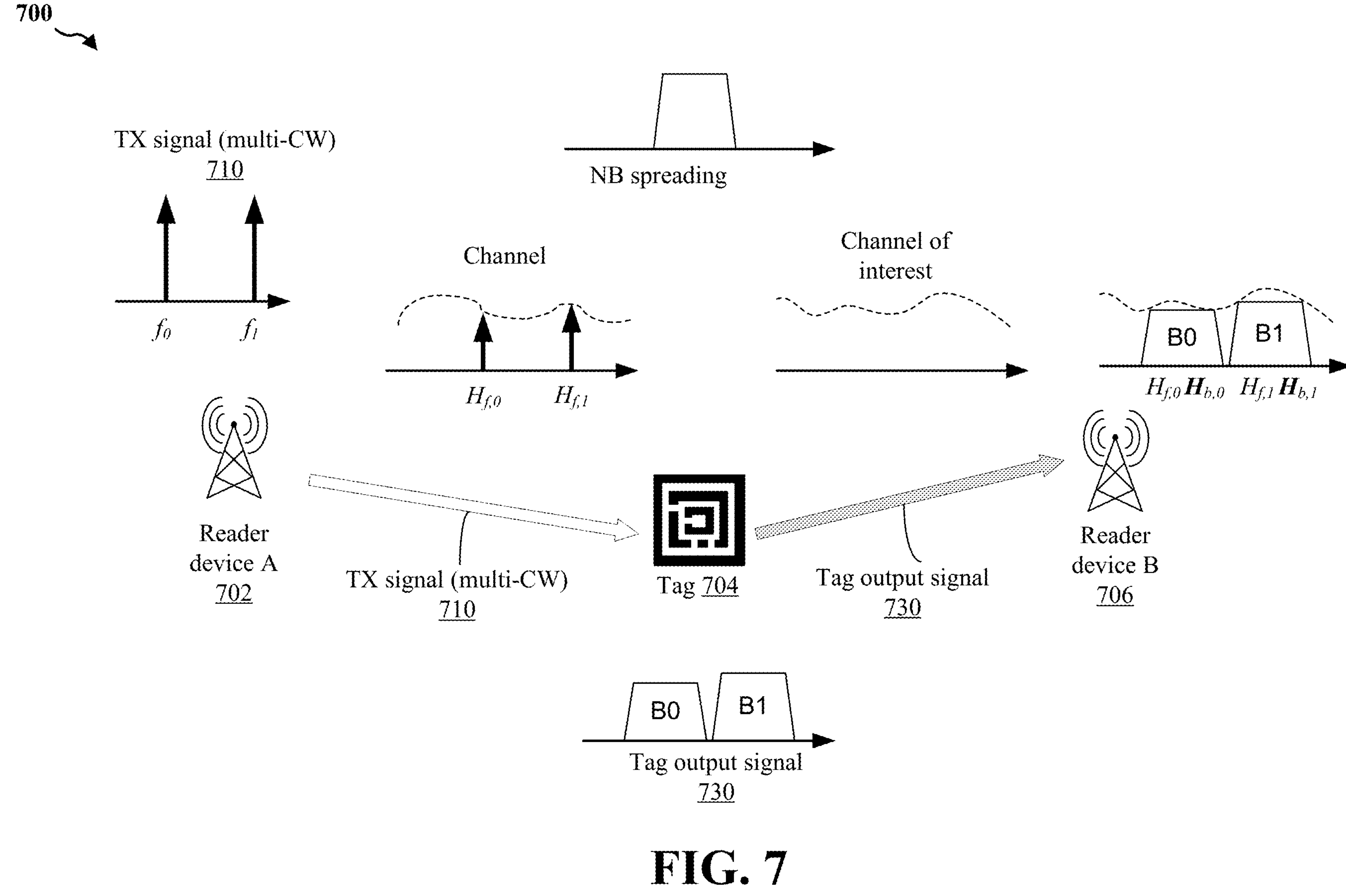
FIG. 7 is a diagram illustrating an example of an RFID reader transmitting multiple single-tone signals.

FIG. 7 is a diagram 700 illustrating an example of a reader transmitting multiple single-tone signals. In FIG. 7, a reader device A 702 may transmit multiple single-tone signals 710 (e.g., signals $f_0$ and $f_1$), and each single-tone signal may have a corresponding channel gain (e.g., $H_{f,0}$ for signal $f_0$, and $H_{f,1}$ for signal $f_1$). Upon receiving the single-tone signals (e.g., signals $f_0$ and $f_1$), the tag 704 may spread the signals in the frequency domain using a narrow band signal. As a result, the tag output signals 730, which the tag 704 transmits to the reader device B 706, may have a wider frequency band (e.g., B0 and B1) compared to the signal initially received by the tag 704.

In some aspects, in order to enable channel estimation, the reader may transmit the same signal, while the tag shifts the frequency by the difference between the CW tones. This frequency shift at the tag allows the forward channel experienced by the first CW to contribute to the channel estimation for the second band. By jointly processing this transmission with the no-shift case, accurate channel estimation may be obtained.

For example, the received channel at the reader in the first band of the second transmission can be processed with the first band in the first transmission, as both have the same forward channel gains. Upon receiving the single-tone signals (e.g., signals $f_0$ and $f_1$), the tag 804 may spread the signals in the frequency domain using a narrow band signal.

Figure 8:
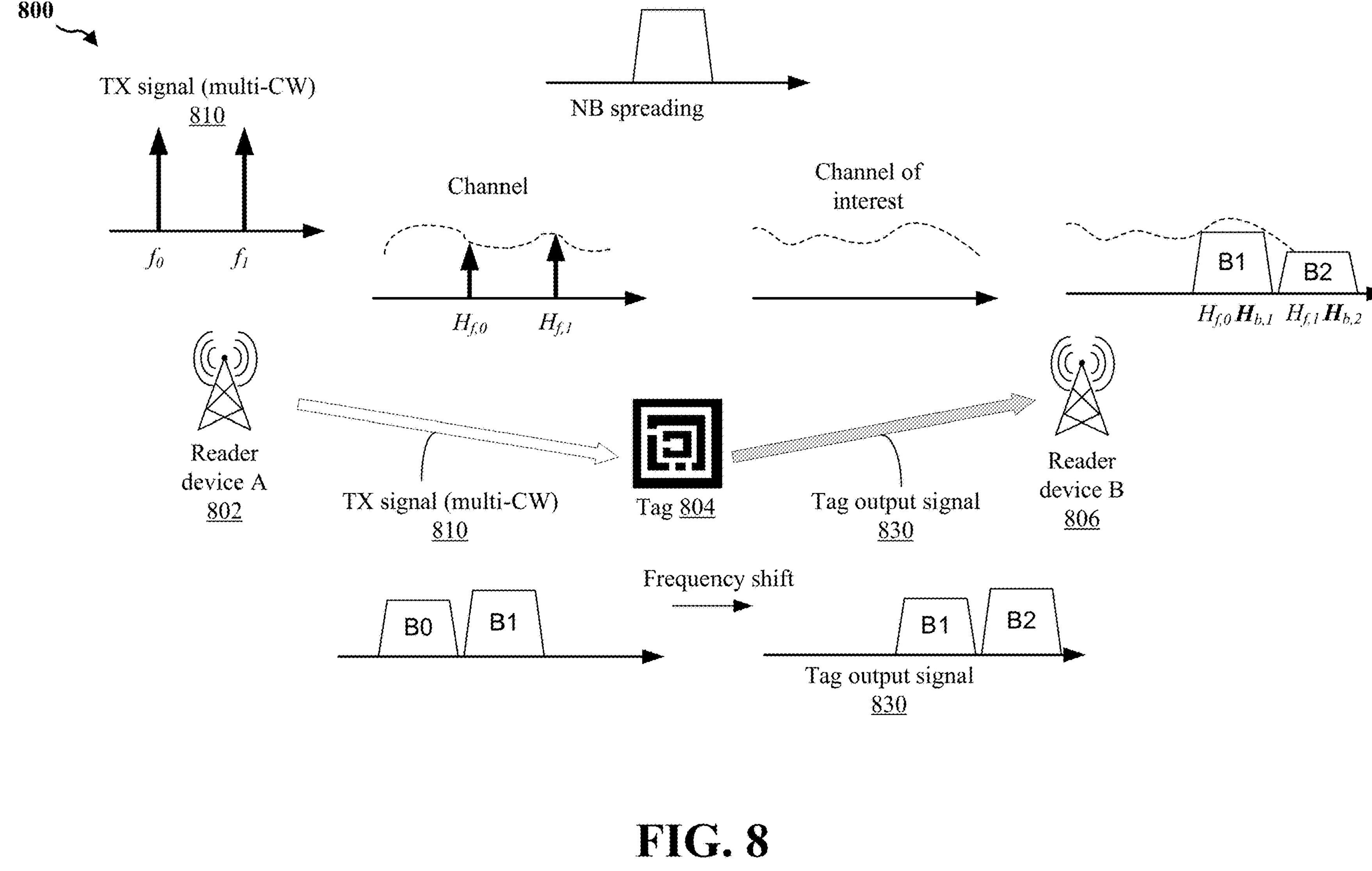
FIG. 8 is a diagram illustrating an example of channel estimation with different frequency shifts on the received signals in accordance with various aspects of the present disclosure.

FIG. 8 is a diagram 800 illustrating an example of channel estimation with different frequency shifts on the received signals. In FIG. 8, a reader device A 802 may transmit a set of single-tone signals (e.g., signals $f_0$ and $f_1$) multiple times, and each single-tone signal may have a corresponding channel gain (e.g., $H_{f,0}$ for signal $f_0$, and $H_{f,1}$ for signal $f_1$). Upon receiving the single-tone signals (e.g., signals $f_0$ and $f_1$), the tag 804 may spread the signals in the frequency domain using a narrow band signal, and the signals after the frequency spread may have a wider frequency band (e.g., B0 and B1) compared to the signal initially received by the tag 804. The tag 804 may apply no frequency shift for the first set of single-tone signals, and apply a frequency shift on the second set of single-tone signals. In one example, the frequency shift amount may be the frequency interval between the signal-tone signals (e.g., the frequency interval between signals $f_0$ and $f_1$), and the frequency band B0 and B1 are shifted to B1 and B2, respectively. At reader device B 806, the received signals corresponding to signals $f_0$ and $f_1$ in the second transmission have the channel gains of $H_{f,0}H_{b,1}$ and $H_{f,0}H_{b,2}$, respectively, as shown in FIG. 8. From $H_{f,0}H_{b,0}$ in the first transmission and $H_{f,0}H_{b,1}$ in the second transmission, the relative backward channel in the bands B0 and B1 can be determined.

This method also necessitates sweeping the CW tones to cover the full band and overlapping subbands to cover the frequency gap between subbands. This can be achieved by using different frequency shifts, which ensures comprehensive coverage of the frequency spectrum and also improves the accuracy and efficiency of the RFID system.

Figure 9:
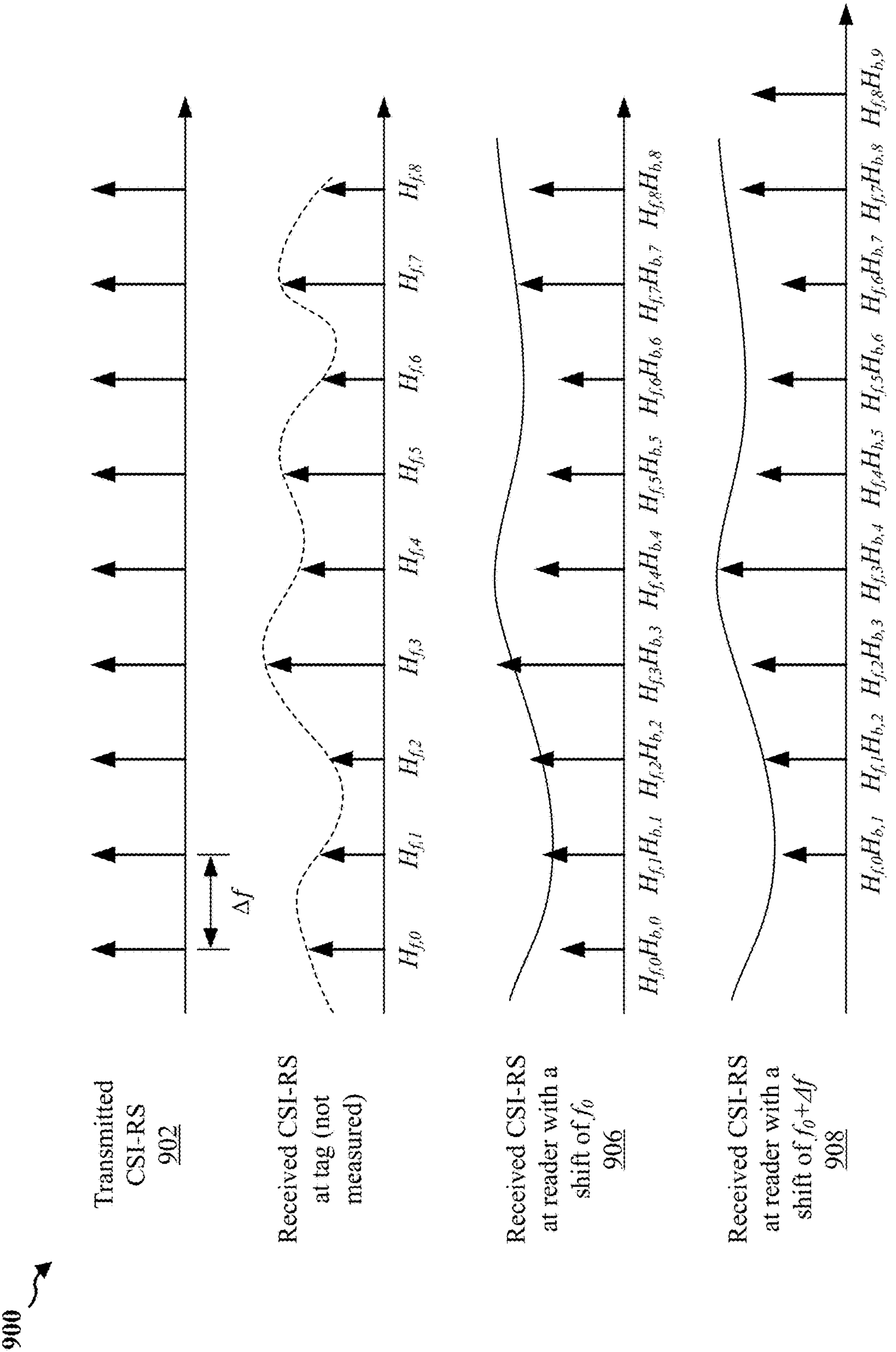
FIG. 9 is a diagram illustrating an example of using a comb type CSI-RS for channel estimation in accordance with various aspects of the present disclosure.

A "comb-type CSI-RS" is a specific type of CSI-RS signal that consists of a set of subcarriers spaced at regular intervals to form a comb-like pattern. In some aspects, a comb type CSI-RS signal with multiple frequency shifts may be used for channel estimation. FIG. 9 is a diagram 900 illustrating an example of using a comb type CSI-RS for channel estimation. In some examples, the TX reader may send a comb-like waveform (e.g., the comb type CSI-RS 902), with the spacing between the tones being $\Delta f$. The tag may then backscatter the signal with the frequency shifts of $f_0$ and $f_0+\Delta f$, thus ensuring the overlapping between the shifted and non-shifted signals in the frequency domain. The tag does not perform frequency spread in this case. The reader may measure the channel for both backscattered transmissions and use the measurement jointly for channel estimation.

Referring to FIG. 9, with frequency offset $f_0$, the receiver may measure $\{H_{f,0}H_{b,0}, H_{f,1}H_{b,1} \ldots\}$, or in general $H_{f,i}H_{b,i}$ (i=0, . . . , k−1 (k is the number subcarriers in the comb type CSI-RS)) on the received CSI-RS 906. With frequency offset $f_0+\Delta f$, the receiver may measure $\{H_{f,0}H_{b,1}, H_{f,1}H_{b,2}, \ldots\}$, or in general $H_{f,i}H_{b,i+1}$, (i=0, k−2) on the received CSI-RS 908. With this information, the receiver may compute $$\frac{H_{b,i+1}}{H_{b,i}}$$

for all i, and $$\frac{H_{f,i+1}}{H_{f,i}}$$

for all i.

The receiver may further compute $$\frac{H_{b,i+k}}{H_{b,i}} = \frac{H_{b,i+1}}{H_{b,i}} \cdot \frac{H_{b,i+2}}{H_{b,i+1}} \cdots \frac{H_{b,i+k}}{H_{b,i+k-1}}$$

for all i and k, and $$\frac{H_{f,i+k}}{H_{f,i}} = \frac{H_{f,i+1}}{H_{f,i}} \cdot \frac{H_{f,i+2}}{H_{f,i+1}} \cdots \frac{H_{f,i+k}}{H_{f,i+k-1}}$$

for all i. Then, the forward link (FL) channel and backscatter (BS) channel may be constructed as $$H_{f,0} \times \left\{\frac{H_{f,1}}{H_{f,0}}, \frac{H_{f,2}}{H_{f,0}}, \ldots\right\} \text{ and } H_{b,0} \times \left\{\frac{H_{b,1}}{H_{b,0}}, \frac{H_{b,2}}{H_{b,0}}, \ldots\right\},$$

respectively, where $H_{f,0}$ and $H_{b,0}$ are the reference channels.

It is important to note that the receiver does not know $H_{f,0}$ and $H_{b,0}$ individually. However, this may not affect the precoding, which is based on a relative channel ratio between the different subcarriers. This method offers an efficient and accurate way to estimate the channel, thus enhancing the performance of the RFID system.

The comb-like current Channel State Information-Reference Signal (CSI-RS) or Sounding Reference Signal (SRS) is an advantage in this approach. However, in some examples, the error may be accumulated from the multiple products involved in the calculations. In some aspects, to address the error accumulation, an additional shift of $f_0+k\Delta f$ may be used to stop the error accumulation, and some of the ratios may be computed using the shift of $f_0+k\Delta f$. In some aspects, instead of using $H_{f,0}$ as the reference channel, the middle frequency may be selected as the reference point. For example, in a system with eight tones, $H_{f,4}$ (instead of $H_{f,0}$) may be chosen as the reference point. This method may reduce the number of multiplications to obtain the relative ratios, which, in turn, lowers the error accumulation. By choosing the middle frequency as the reference, the maximum number of multiplications utilized may be reduced from eight (in the case of $H_{f,0}$) to four.

Figure 10:
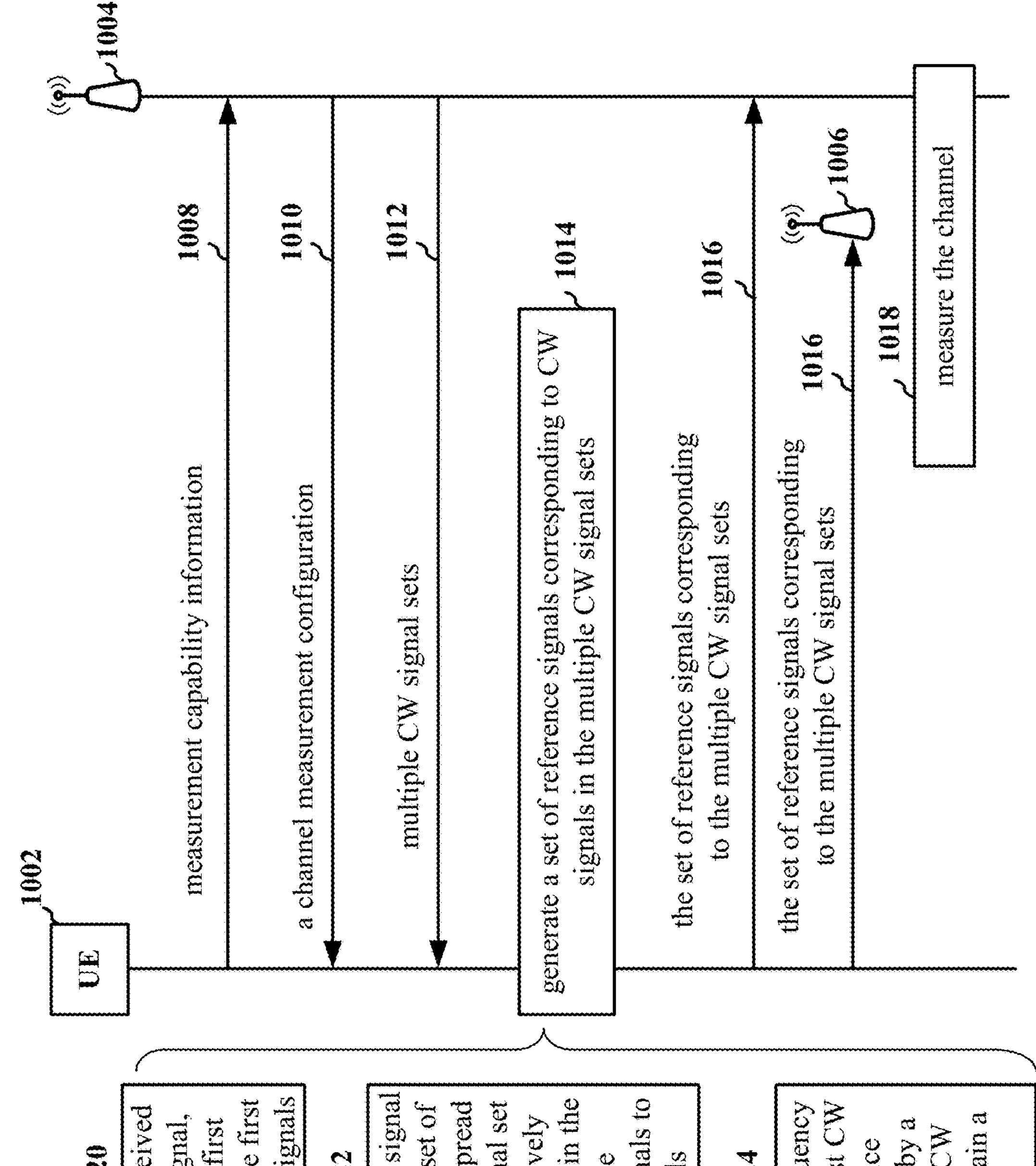
FIG. 10 is a call flow diagram illustrating a method of wireless communication in accordance with various aspects of the present disclosure.

FIG. 10 is a call flow diagram 1000 illustrating a method of wireless communication in accordance with various aspects of this present disclosure. Aspects are described herein in connection with a network entity 1004. The network entity may be a base station, or a component of a base station, in the access network of FIG. 1, a core network component, or an RFID reader device in an RFID system (e.g., base station 102, 310; network entity 1004; RFID reader device A 602, 702, 802; or the network entity 1502 in the hardware implementation of FIG. 15).

In FIG. 10, at 1008, a UE 1002 may transmit measurement capability information to the network entity 1004. The measurement capability information may include the modulation order for the frequency spread, the frequency shift capability of the UE, and the frequency spread capability of the UE. The UE may be the UE 104, 350, 1002, RFID tag 604, 704, 804, or the apparatus 1504 in the hardware implementation of FIG. 15. For example, referring to FIG. 6, a UE (tag 604) may transmit, at 622, measurement capability information to the network entity (reader device A 602).

At 1010, the UE 1002 may receive a channel measurement configuration from the network entity 1004. The channel measurement configuration may include a frequency shift amount and a frequency spread amount for each of the multiple first CW signals to be sent to the UE 1002 by the network entity 1004. For example, referring to FIG. 6, the UE (tag 604) may receive, at 624, a channel measurement configuration from the network entity (reader device A 602).

At 1012, the UE 1002 may receive multiple CW signal sets from the network entity 1004. Each CW signal set of the multiple CW signal sets may include at least one CW signal. For example, referring to FIGS. 6, 7, and 8, the UE (tag 604, 704, 804) may receive multiple CW signal sets (610, 710, 810) from the network entity (reader device A 602, 702, 802).

At 1014, the UE 1002 may generate a set of reference signals corresponding to CW signals in the multiple CW signal sets. The set of reference signals may be generated based on at least one of a frequency spread or a frequency shift on the CW signals in the multiple CW signal sets. For example, referring to FIGS. 6, 7, and 8, the UE (tag 604, 704, and 804) may generate a set of reference signals (630, 730, and 830) corresponding to CW signals in the multiple CW signal sets (610, 710, and 810).

At 1016, in some examples, the UE 1002 may transmit the set of reference signals corresponding to the multiple CW signal sets to the network entity 1004. In some examples, at 1016, the UE 1002 may transmit the set of reference signals corresponding to the multiple CW signal sets to a network entity 1006 different from the network entity 1004. For example, referring to FIGS. 6, 7, and 8, the UE (tag 604, 704, and 804) may transmit the set of reference signals corresponding to the multiple CW signal sets to a second network entity (reader device B 606, 706, and 806).

At 1018, the network entity 1004 may measure, based on the set of reference signals, a channel between the UE 1002 and the network entity 1004.

In some aspects, each CW signal set of the multiple CW signal sets may include one first CW signal of multiple first CW signals corresponding to a first frequency band in a frequency domain. When generating a set of reference signals corresponding to CW signals in the multiple CW signal sets, the UE 1002 may, at 1020, perform the frequency spread on each received first CW signal to obtain a first spread signal. As used herein, a "spread signal" refers to a spread spectrum signal obtained through frequency spreading a CW signal to spread its energy over a wider frequency spectrum. The first spread signal may correspond to a second frequency band wider than the first frequency band in the frequency domain. At 1020, the UE 1002 may further perform the frequency shift on each first spread signal corresponding to the multiple first CW signals to obtain the set of reference signals. The amount of the frequency shift is different for each first CW signal. For example, referring to FIG. 6, each CW signal set of the multiple CW signal sets may include one first CW signal (TX signal 610) of multiple first CW signals corresponding to a first frequency band in a frequency domain. When generating a set of reference signals corresponding to CW signals in the multiple CW signal sets, the UE (tag 604) may perform the frequency spread on each received first CW signal to obtain a first spread signal, and perform the frequency shift on each first spread signal corresponding to the multiple first CW signals to obtain the set of reference signals (signals 630). The amount of the frequency shift is different for each first CW signal (e.g., multiple first CW signals are respectively shifted to frequencies $f_1, f_2, \ldots, f_5$ in the frequency domain).

In some aspects, when receiving the multiple CW signal sets at 1012, the UE 1002 may receive a first CW signal set including multiple CW signals, and receive a second CW signal set including the same multiple CW signals as the first CW signal set. The CW signals may respectively correspond to different frequency bands. And when generating the set of reference signals corresponding to the CW signals in the multiple CW signal sets at 1014, the UE 1002 may, at 1022, perform the frequency spread on each CW signal of the first CW signal set to obtain a first set of reference signals, where each of the first set of reference signals respectively corresponds to first reference frequency bands not overlapping with each other, perform the frequency spread on each CW signal of the second CW signal set to obtain multiple spread signals respectively corresponding to the multiple CW signals in the second CW signal set, where spread signals in the multiple spread signals respectively correspond to spread frequency bands not overlapping with each other, and perform the frequency shift on the multiple spread signals to obtain a second set of reference signals. For example, referring to FIG. 8, the UE (tag 804) may receive a first CW signal set (TX signal 810) including multiple CW signals (signals at $f_0$ and $f_1$), and receive a second CW signal set including the same multiple CW signals as the first CW signal set. When generating the set of reference signals (tag output signals 830) corresponding to the CW signals in the multiple CW signal sets, the UE (tag 804) may perform the frequency spread on each CW signal of the first CW signal set to obtain a first set of reference signals, where each of the first set of reference signals respectively corresponds to first reference frequency bands not overlapping with each other (frequency bands B0 and B1 do not overlap with each other), perform the frequency spread on each CW signal of the second CW signal set to obtain multiple spread signals respectively corresponding to the multiple CW signals in the second CW signal set, where spread signals in the multiple spread signals respectively correspond to spread frequency bands not overlapping with each other, and perform the frequency shift on the multiple spread signals to obtain a second set of reference signals (obtained by shifting frequency bands B0 and B1 to B1 and B2, respectively). In some aspects, when receiving the multiple CW signal sets at 1012, the UE 1002 may receive a first CW signal set including multiple CW signals with a frequency interval between adjacent CW signals of the multiple CW signals in a frequency domain, and receive a second CW signal set including the same multiple CW signals as the first CW signal set, where the multiple CW signals respectively correspond to different frequency bands in the frequency domain. And when generating the set of reference signals corresponding to the CW signals in the multiple CW signal sets at 1014, the UE 1002 may, at 1024 perform the frequency shift by a first frequency shift amount on each CW signal of the first CW signal set to obtain a first set of reference signals, and perform the frequency shift by a second frequency shift amount on each CW signal of the second CW signal set to obtain a second set of reference signals. The set of reference signals may include the first set of reference signals and the second set of reference signals. For example, referring to FIG. 9, when generating the set of reference signals corresponding to the CW signals in the multiple CW signal sets, the UE may perform the frequency shift by a first frequency shift amount ($f_0$) on each CW signal of the first CW signal set to obtain a first set of reference signals (CSI-RS 906), and perform the frequency shift by a second frequency shift amount ($f_0+\Delta f$) on each CW signal of the second CW signal set to obtain a second set of reference signals (CSI-RS 908).

Figure 11:
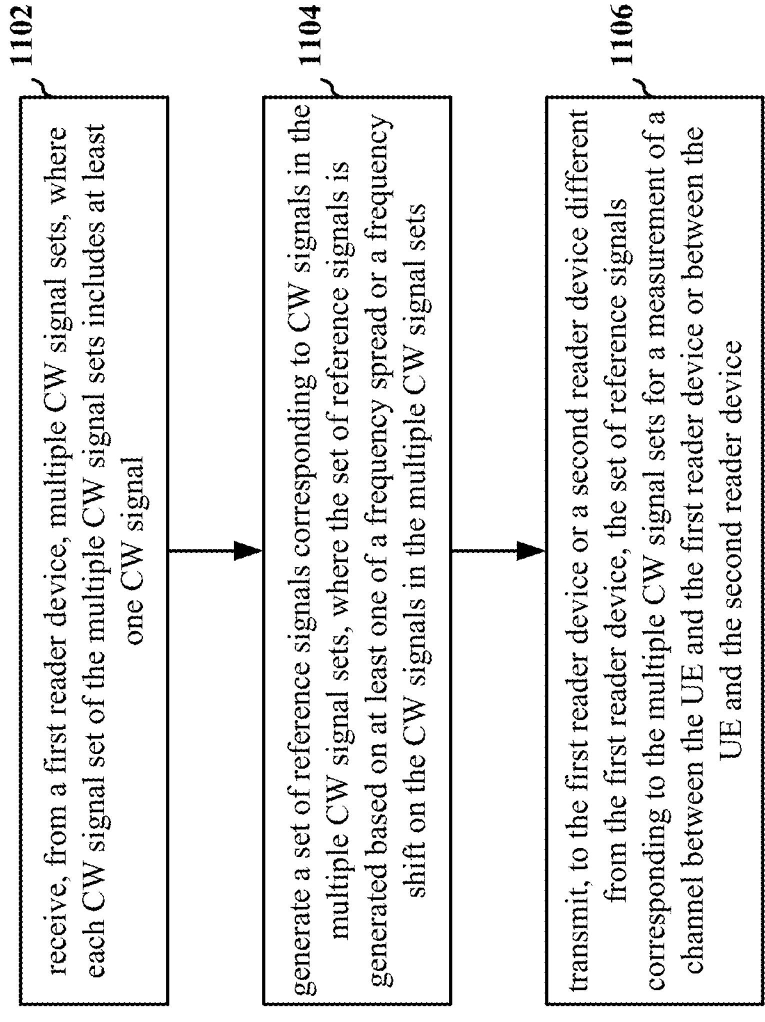
FIG. 11 is a flowchart illustrating methods of wireless communication at a UE in accordance with various aspects of the present disclosure.

FIG. 11 is a flowchart 1100 illustrating methods of wireless communication at a UE in accordance with various aspects of the present disclosure. The method may be performed by a UE. The UE may be the UE 104, 350, 1002, RFID tag 604, 704, 804, or the apparatus 1504 in the hardware implementation of FIG. 15. The method allows for improved channel estimation while adhering to the PSD limitations and overcoming the challenges posed by distance and path loss. By utilizing multiple measurements of narrow bands and adjusting the spread bandwidth accordingly, RFID systems can achieve more accurate channel estimations, leading to enhanced performance in various operating conditions.

As shown in FIG. 11, at 1102, the UE may receive, from a first reader device, multiple CW signal sets. Each CW signal set of the multiple CW signal sets may include at least one CW signal. The first reader device may be a base station, or a component of a base station, in the access network of FIG. 1, a core network component, or an RFID reader device in an RFID system (e.g., base station 102, 310; network entity 1004; RFID reader device A 602, 702, 802; or the network entity 1502 in the hardware implementation of FIG. 15). FIGS. 6, 7, 8, 9, and 10 illustrate various aspects of the steps in connection with flowchart 1100. For example, referring to FIG. 10, the UE 1002 may receive, at 1012, from a first reader device (network entity 1004), multiple CW signal sets. Referring to FIGS. 6, 7, and 8, the UE (tag 604, 704, 804) may receive multiple CW signal sets (610, 710, 810) from the network entity (reader device A 602, 702, 802). In some aspects, 1102 may be performed by the backscatter link channel estimation component 198.

At 1104, the UE may generate a set of reference signals corresponding to CW signals in the multiple CW signal sets. The set of reference signals may be generated based on at least one of a frequency spread or a frequency shift on the CW signals in the multiple CW signal sets. For example, referring to FIG. 10, the UE 1002 may, at 1014, generate a set of reference signals corresponding to CW signals in the multiple CW signal sets. Referring to FIGS. 6, 7, and 8, the UE (tag 604, 704, and 804) may generate a set of reference signals (630, 730, and 830) corresponding to CW signals in the multiple CW signal sets (610, 710, and 810). The set of reference signals (630, 730, and 830) may be generated based on at least one of a frequency spread or a frequency shift on the CW signals in the multiple CW signal sets. In some aspects, 1104 may be performed by the backscatter link channel estimation component 198.

At 1106, the UE may transmit, to the first reader device or a second reader device different from the first reader device, the set of reference signals corresponding to the multiple CW signal sets for a measurement of a channel between the UE and the first reader device or between the UE and the second reader device. The second reader device may be a base station, or a component of a base station, in the access network of FIG. 1, a core network component, or a reader device in an RFID system (e.g., base station 102, 310; network entity 1004; RFID reader device B 606, 706, 806, or the network entity 1502 in the hardware implementation of FIG. 15). For example, referring to FIG. 10, the UE 1002 may transmit, at 1016, to the first reader device (network entity 1004) or a second reader device (network entity 1006) different from the first reader device (network entity 1004), the set of reference signals corresponding to the multiple CW signal sets. Referring to FIGS. 6, 7, and 8, the UE (tag 604, 704, and 804) may transmit the set of reference signals corresponding to the multiple CW signal sets to a second network entity (reader device B 606, 706, and 806). In some aspects, 1104 may be performed by the backscatter link channel estimation component 198.

Figure 12:
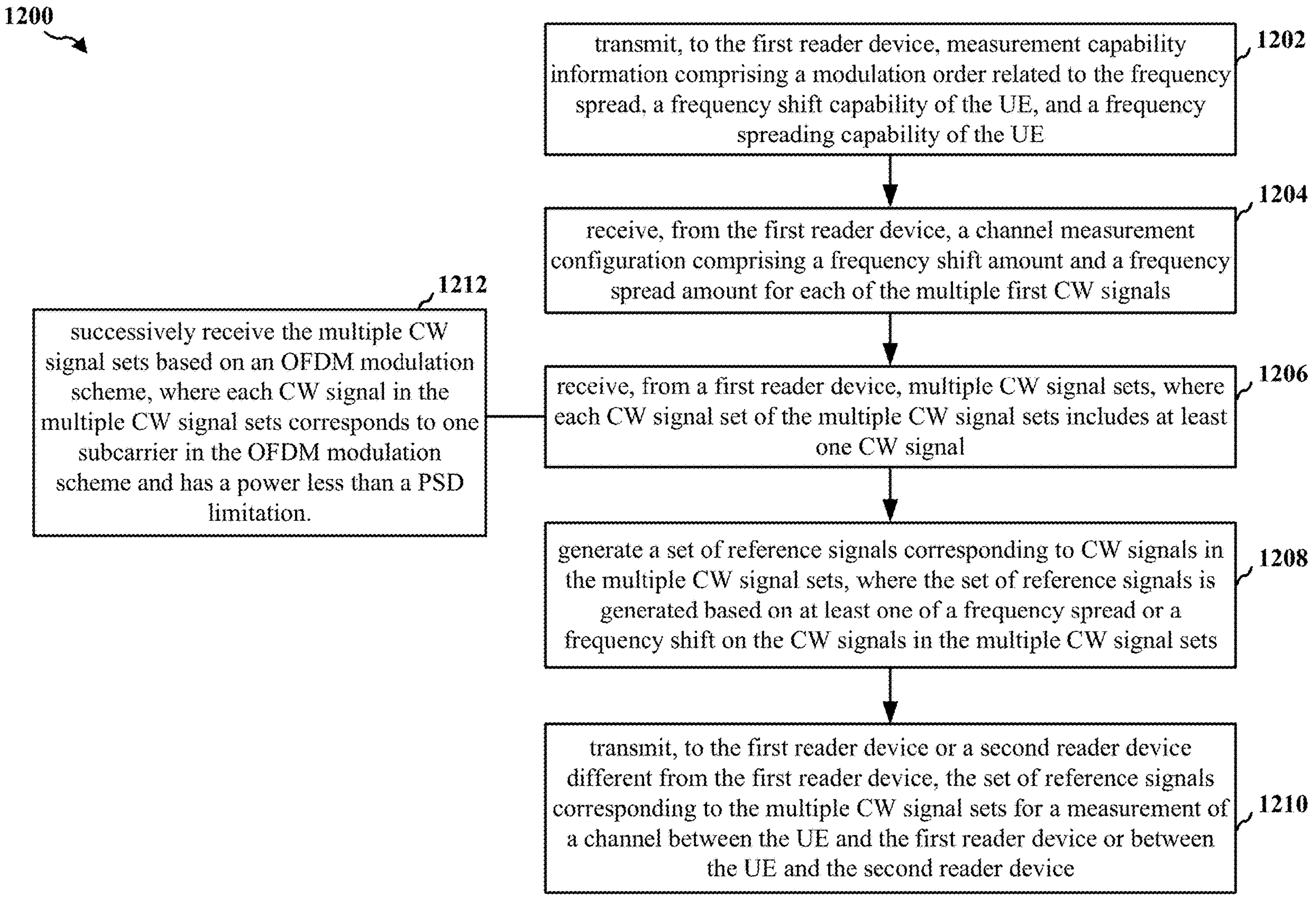
FIG. 12 is a flowchart illustrating methods of wireless communication at a UE in accordance with various aspects of the present disclosure.

FIG. 12 is a flowchart 1200 illustrating methods of wireless communication at a UE in accordance with various aspects of the present disclosure. The method may be performed by a UE. The UE may be the UE 104, 350, 1002, RFID tag 604, 704, 804, or the apparatus 1504 in the hardware implementation of FIG. 15. The method allows for improved channel estimation while adhering to the PSD limitations and overcoming the challenges posed by distance and path loss. By utilizing multiple measurements of narrow bands and adjusting the spread bandwidth accordingly, RFID systems can achieve more accurate channel estimations, leading to enhanced performance in various operating conditions.

As shown in FIG. 12, at 1206, the UE may receive, from a first reader device, multiple CW signal sets. Each CW signal set of the multiple CW signal sets may include at least one CW signal. The first reader device may be a base station, or a component of a base station, in the access network of FIG. 1, a core network component, or an RFID reader device in an RFID system (e.g., base station 102, 310; network entity 1004; RFID reader device A 602, 702, 802; or the network entity 1502 in the hardware implementation of FIG. 15). FIGS. 6, 7, 8, 9, and 10 illustrate various aspects of the steps in connection with flowchart 1200. For example, referring to FIG. 10, the UE 1002 may receive, at 1012, from a first reader device (network entity 1004), multiple CW signal sets. Referring to FIGS. 6, 7, and 8, the UE (tag 604, 704, 804) may receive multiple CW signal sets (610, 710, 810) from the network entity (reader device A 602, 702, 802). In some aspects, 1206 may be performed by the backscatter link channel estimation component 198.

At 1208, the UE may generate a set of reference signals corresponding to CW signals in the multiple CW signal sets. The set of reference signals may be generated based on at least one of a frequency spread or a frequency shift on the CW signals in the multiple CW signal sets. For example, referring to FIG. 10, the UE 1002 may, at 1014, generate a set of reference signals corresponding to CW signals in the multiple CW signal sets. Referring to FIGS. 6, 7, and 8, the UE (tag 604, 704, and 804) may generate a set of reference signals (630, 730, and 830) corresponding to CW signals in the multiple CW signal sets (610, 710, and 810). The set of reference signals (630, 730, and 830) may be generated based on at least one of a frequency spread or a frequency shift on the CW signals in the multiple CW signal sets. In some aspects, 1208 may be performed by the backscatter link channel estimation component 198.

At 1210, the UE may transmit, to the first reader device or a second reader device different from the first reader device, the set of reference signals corresponding to the multiple CW signal sets for a measurement of a channel between the UE and the first reader device or between the UE and the second reader device. The second reader device may be a base station, or a component of a base station, in the access network of FIG. 1, a core network component, or a reader device in an RFID system (e.g., base station 102, 310; network entity 1004; RFID reader device B 606, 706, 806, or the network entity 1502 in the hardware implementation of FIG. 15). For example, referring to FIG. 10, the UE 1002 may transmit, at 1016, to the first reader device (network entity 1004) or a second reader device (network entity 1006) different from the first reader device (network entity 1004), the set of reference signals corresponding to the multiple CW signal sets. Referring to FIGS. 6, 7, and 8, the UE (tag 604, 704, and 804) may transmit the set of reference signals corresponding to the multiple CW signal sets to a second network entity (reader device B 606, 706, and 806). In some aspects, 1210 may be performed by the backscatter link channel estimation component 198.

In some aspects, at 1212, to receive the multiple CW signal sets, the UE may be configured to: successively receive the multiple CW signal sets based on an OFDM modulation scheme. Each CW signal in the multiple CW signal sets may correspond to one subcarrier in the OFDM modulation scheme and has a power less than a PSD limitation. For example, referring to FIG. 10, when receiving the multiple CW signal sets at 1012, the UE 1002 may be configured to successively receive the multiple CW signal sets based on an OFDM modulation scheme, and each CW signal in the multiple CW signal sets may correspond to one subcarrier in the OFDM modulation scheme and has a power less than a PSD limitation.

In some aspects, each CW signal set of the multiple CW signal sets may include one first CW signal of multiple first CW signals corresponding to a first frequency band in a frequency domain. To generate the set of reference signals corresponding to the CW signals in the multiple CW signal sets, the UE may be configured to: perform the frequency spread on each received first CW signal to obtain a first spread signal, where the first spread signal corresponds to a second frequency band wider than the first frequency band in the frequency domain, and perform the frequency shift on each first spread signal corresponding to the multiple first CW signals to obtain the set of reference signals, where an amount of the frequency shift is different for each first CW signal. For example, referring to FIG. 10, at 1020, when generating a set of reference signals corresponding to CW signals in the multiple CW signal sets, the UE 1002 may, at 1020, perform the frequency spread on each received first CW signal to obtain a first spread signal. The first spread signal may correspond to a second frequency band wider than the first frequency band in the frequency domain, and perform the frequency shift on each first spread signal corresponding to the multiple first CW signals to obtain the set of reference signals. The amount of the frequency shift is different for each first CW signal. Referring to FIG. 6, each CW signal set of the multiple CW signal sets may include one first CW signal (TX signal 610) of multiple first CW signals corresponding to a first frequency band in a frequency domain. When generating a set of reference signals corresponding to CW signals in the multiple CW signal sets, the UE (tag 604) may perform the frequency spread on each received first CW signal to obtain a first spread signal, and perform the frequency shift on each first spread signal corresponding to the multiple first CW signals to obtain the set of reference signals (signals 630). The amount of the frequency shift is different for each first CW signal (e.g., multiple first CW signals are respectively shifted to frequencies $f_1, f_2, \ldots, f_5$ in the frequency domain).

In some aspects, the set of reference signals may cover a measurement frequency range for the measurement of the channel in the frequency domain. For example, referring to FIG. 6, the set of reference signals (signals 630, including frequency shifted signals at $f_1, \ldots, f_5$) may cover a measurement frequency range for the measurement of the channel in the frequency domain.

In some aspects, each reference signal of the set of reference signals may correspond to a reference frequency band in the frequency domain, and each reference frequency band corresponding to the set of reference signals may be approximately equally spaced over the measurement frequency range. For example, referring to FIG. 6, each reference frequency band corresponding to the set of reference signals (signals 630, including frequency shifted signals at $f_1, \ldots, f_5$) may be approximately equally spaced over the measurement frequency range (the frequency bands corresponding to signals at $f_1, \ldots, f_5$ may be approximately equally spaced). As used herein, "approximately equally spaced" means that the differences between the distances are relatively small, for example, less than 5% of the total distance.

In some aspects, each first spread signal may be approximately uniformly distributed over the second frequency band in the frequency domain. For example, referring to FIG. 6, each first spread signal (signals at $f_1, \ldots, f_5$) may be approximately uniformly distributed over the second frequency band in the frequency domain. As used herein, "approximately uniformly distributed" refers to a frequency distribution that closely resembles a uniform distribution, where the majority of frequency components (e.g., 90%) are within a small margin (e.g., within 5%) of a constant value.

In some aspects, to perform the frequency spread on each received first CW signal, the UE may be configured to perform the frequency spread on each received first CW signal based on a ZC sequence in a time domain. For example, referring to FIG. 10, when performing the frequency spread on each received first CW signal at 1020, the UE 1002 may perform the frequency spread on each received first CW signal based on a ZC sequence in the time domain.

In some aspects, to perform the frequency spread on each received first CW signal based on the ZC sequence, the UE may be configured to generate a backscatter modulator with a load, where the load corresponds to an order of the backscatter modulator approximating the ZC sequence; and perform the frequency spread on each received first CW signal based on the backscatter modulator. For example, referring to FIG. 10, at 1020, when performing the frequency spread on each received first CW signal based on the ZC sequence, the UE 1002 may generate a backscatter modulator with a load, where the load may correspond to an order of the backscatter modulator approximating the ZC sequence, and perform the frequency spread on each received first CW signal (received at 1012) based on the backscatter modulator.

At 1202, the UE may transmit, to the first reader device, measurement capability information including a modulation order related to the frequency spread, a frequency shift capability of the UE, and a frequency spread capability of the UE. For example, referring to FIG. 6, the UE (tag 604) may transmit, to the first reader device (reader device A 602), measurement capability information 622. The measurement capability information 622 may include a modulation order related to the frequency spread, a frequency shift capability of the UE (tag 604), and a frequency spread capability of the UE (tag 604). In some aspects, 1202 may be performed by the backscatter link channel estimation component 198.

At 1204, the UE may receive, from the first reader device, a channel measurement configuration including a frequency shift amount and a frequency spread amount for each of the multiple first CW signals. For example, referring to FIG. 6, the UE (tag 604) may receive, from the first reader device (reader device A 602), a channel measurement configuration (624) including a frequency shift amount and a frequency spread amount for each of the multiple first CW signals. In some aspects, 1204 may be performed by the backscatter link channel estimation component 198.

In some aspects, two or more first CW signals of the multiple first CW signals may have the same frequency shift amount and the same frequency spread amount. For example, referring to FIG. 10, when performing frequency spread and frequency shift at 1020, two or more first CW signals of the multiple first CW signals (received at 1012) may have the same frequency shift amount and the same frequency spread amount.

In some aspects, to receive the multiple CW signal sets, the UE may be configured to: receive a first CW signal set including multiple CW signals, and receive a second CW signal set including the same multiple CW signals as the first CW signal set. The CW signals may respectively correspond to different frequency bands. To generate the set of reference signals corresponding to the CW signals in the multiple CW signal sets, the UE may be configured to perform the frequency spread on each CW signal of the first CW signal set to obtain a first set of reference signals, where each of the first set of reference signals respectively corresponds to first reference frequency bands not overlapping with each other, perform the frequency spread on each CW signal of the second CW signal set to obtain multiple spread signals respectively corresponding to the multiple CW signals in the second CW signal set, where spread signals in the multiple spread signals respectively correspond to spread frequency bands not overlapping with each other, and perform the frequency shift on the multiple spread signals to obtain a second set of reference signals, where the set of reference signals includes the first set of reference signals and the second set of reference signals. For example, referring to FIG. 10, when receiving the multiple CW signal sets at 1012, the UE 1002 may receive a first CW signal set including multiple CW signals, and receive a second CW signal set including the same multiple CW signals as the first CW signal set. The CW signals may respectively correspond to different frequency bands. And when generating the set of reference signals corresponding to the CW signals in the multiple CW signal sets at 1014, the UE 1002 may, at 1022, perform the frequency spread on each CW signal of the first CW signal set to obtain a first set of reference signals, where each of the first set of reference signals respectively corresponds to first reference frequency bands not overlapping with each other, perform the frequency spread on each CW signal of the second CW signal set to obtain multiple spread signals respectively corresponding to the multiple CW signals in the second CW signal set, where spread signals in the multiple spread signals respectively correspond to spread frequency bands not overlapping with each other, and perform the frequency shift on the multiple spread signals to obtain a second set of reference signals. For example, referring to FIG. 8, the UE (tag 804) may receive a first CW signal set (TX signal 810) including multiple CW signals (signals at $f_0$ and $f_1$), and receive a second CW signal set including the same multiple CW signals as the first CW signal set. When generating the set of reference signals (tag output signals 830) corresponding to the CW signals in the multiple CW signal sets, the UE (tag 804) may perform the frequency spread on each CW signal of the first CW signal set to obtain a first set of reference signals, where each of the first set of reference signals respectively corresponds to first reference frequency bands not overlapping with each other (frequency bands B0 and B1 do not overlap with each other), perform the frequency spread on each CW signal of the second CW signal set to obtain multiple spread signals respectively corresponding to the multiple CW signals in the second CW signal set, where spread signals in the multiple spread signals respectively correspond to spread frequency bands not overlapping with each other, and perform the frequency shift on the multiple spread signals to obtain a second set of reference signals (obtained by shifting frequency bands B0 and B1 to B1 and B2, respectively). In some aspects, to perform the frequency shift on the multiple spread signals, the UE may be configured to perform the frequency shift on the multiple spread signals based on a frequency shift amount. The frequency shift amount may be based on a frequency gap between a first CW signal and a second CW signal in the second CW signal set. For example, referring to FIG. 8. The frequency shift amount may be based on a frequency gap between signals at $f_0$ and $f_1$.

In some aspects, to receive the multiple CW signal sets, the UE may be configured to receive a first CW signal set including multiple CW signals with a frequency interval between adjacent CW signals of the multiple CW signals in a frequency domain, and receive a second CW signal set including the same multiple CW signals as the first CW signal set. The multiple CW signals respectively may correspond to different frequency bands in the frequency domain. To generate the set of reference signals corresponding to the CW signals in the multiple CW signal sets, the UE may be configured to perform the frequency shift by a first frequency shift amount on each CW signal of the first CW signal set to obtain a first set of reference signals, and perform the frequency shift by a second frequency shift amount on each CW signal of the second CW signal set to obtain a second set of reference signals. The set of reference signals may include the first set of reference signals and the second set of reference signals. For example, referring to FIG. 10, the UE 1002 may perform the frequency shift by a first frequency shift amount on each CW signal of the first CW signal set to obtain a first set of reference signals, and perform the frequency shift by a second frequency shift amount on each CW signal of the second CW signal set to obtain a second set of reference signals.

In some aspects, the difference between the first frequency shift amount and the second frequency shift amount may be approximately equal to the frequency interval. For example, referring to FIG. 9, the difference between the first frequency shift amount ($f_0$) and the second frequency shift amount ($f_0+\Delta f$) may be approximately equal to the frequency interval ($\Delta f$).

In some aspects, the difference between the first frequency shift amount and the second frequency shift amount may be approximately equal to a multiplication of the frequency interval with a coefficient. For example, referring to FIG. 9, in some examples, the difference between the first frequency shift amount ($f_0$) and the second frequency shift amount ($f_0+k\Delta f$) may be approximately equal to a multiplication of the frequency interval ($\Delta f$) with a coefficient (k).

Figure 13:
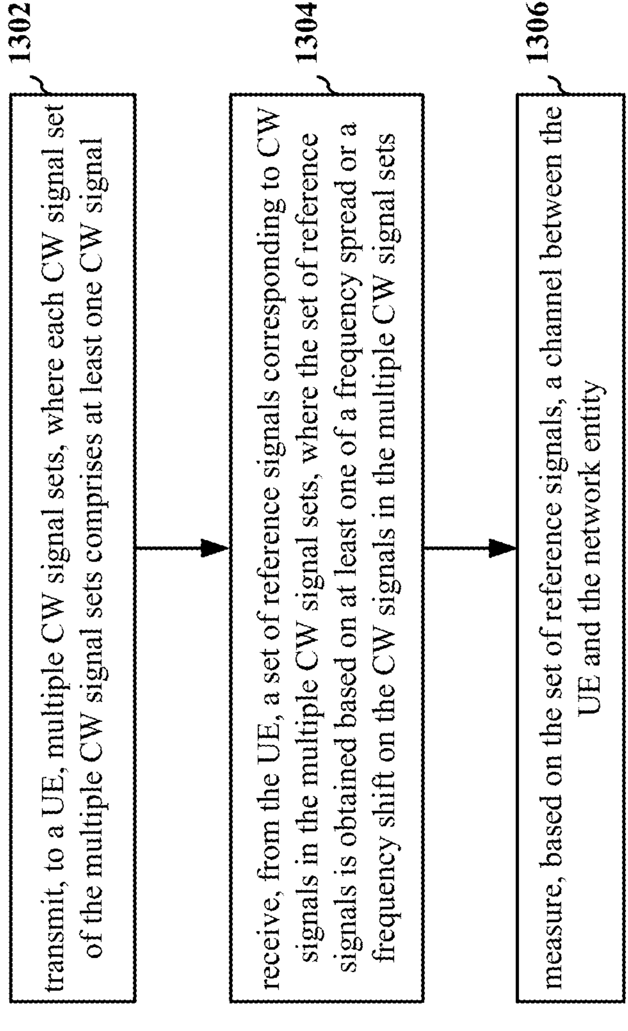
FIG. 13 is a flowchart illustrating methods of wireless communication at a network entity in accordance with various aspects of the present disclosure.

FIG. 13 is a flowchart 1300 illustrating methods of wireless communication at a network entity in accordance with various aspects of the present disclosure. The method may be performed by a network entity. The network entity may be a base station, or a component of a base station, in the access network of FIG. 1, a core network component, or an RFID reader device in an RFID system (e.g., base station 102, 310; network entity 1004; RFID reader device A 602, 702, 802; or the network entity 1502 in the hardware implementation of FIG. 15). The method allows for improved channel estimation while adhering to the PSD limitations and overcoming the challenges posed by distance and path loss. By utilizing multiple measurements of narrow bands and adjusting the spread bandwidth accordingly, RFID systems can achieve more accurate channel estimations, leading to enhanced performance in various operating conditions.

As shown in FIG. 13, at 1302, the network entity may transmit, to a UE, multiple CW signal sets, where each CW signal set of the multiple CW signal sets may include at least one CW signal. The UE may be the UE 104, 350, 1002, RFID tag 604, 704, 804, or the apparatus 1504 in the hardware implementation of FIG. 15. FIGS. 6, 7, 8, 9, and 10 illustrate various aspects of the steps in connection with flowchart 1300. For example, referring to FIG. 10, the network entity 1004 may transmit, at 1012, to a UE 1002, multiple CW signal sets. Referring to FIGS. 6, 7, and 8, the network entity (reader device A 602, 702, 802) may transmit multiple CW signal sets (610, 710, 810) to the UE (tag 604, 704, 804). In some aspects, 1302 may be performed by the backscatter link channel estimation component 199.

At 1304, the network entity may receive, from the UE, a set of reference signals corresponding to CW signals in the multiple CW signal sets. The set of reference signals may be obtained based on at least one of a frequency spread or a frequency shift on the CW signals in the multiple CW signal sets. For example, referring to FIG. 10, the network entity 1004 may receive, at 1016, from the UE 1002, the set of reference signals corresponding to the multiple CW signal sets. In some aspects, 1304 may be performed by the backscatter link channel estimation component 199.

At 1306, the network entity may measure, based on the set of reference signals, a channel between the UE and the network entity. For example, referring to FIG. 10, the network entity 1004 may measure, at 1018, based on the set of reference signals (received at 1016), a channel between the UE 1002 and the network entity 1004. In some aspects, 1306 may be performed by the backscatter link channel estimation component 199.

Figure 14:
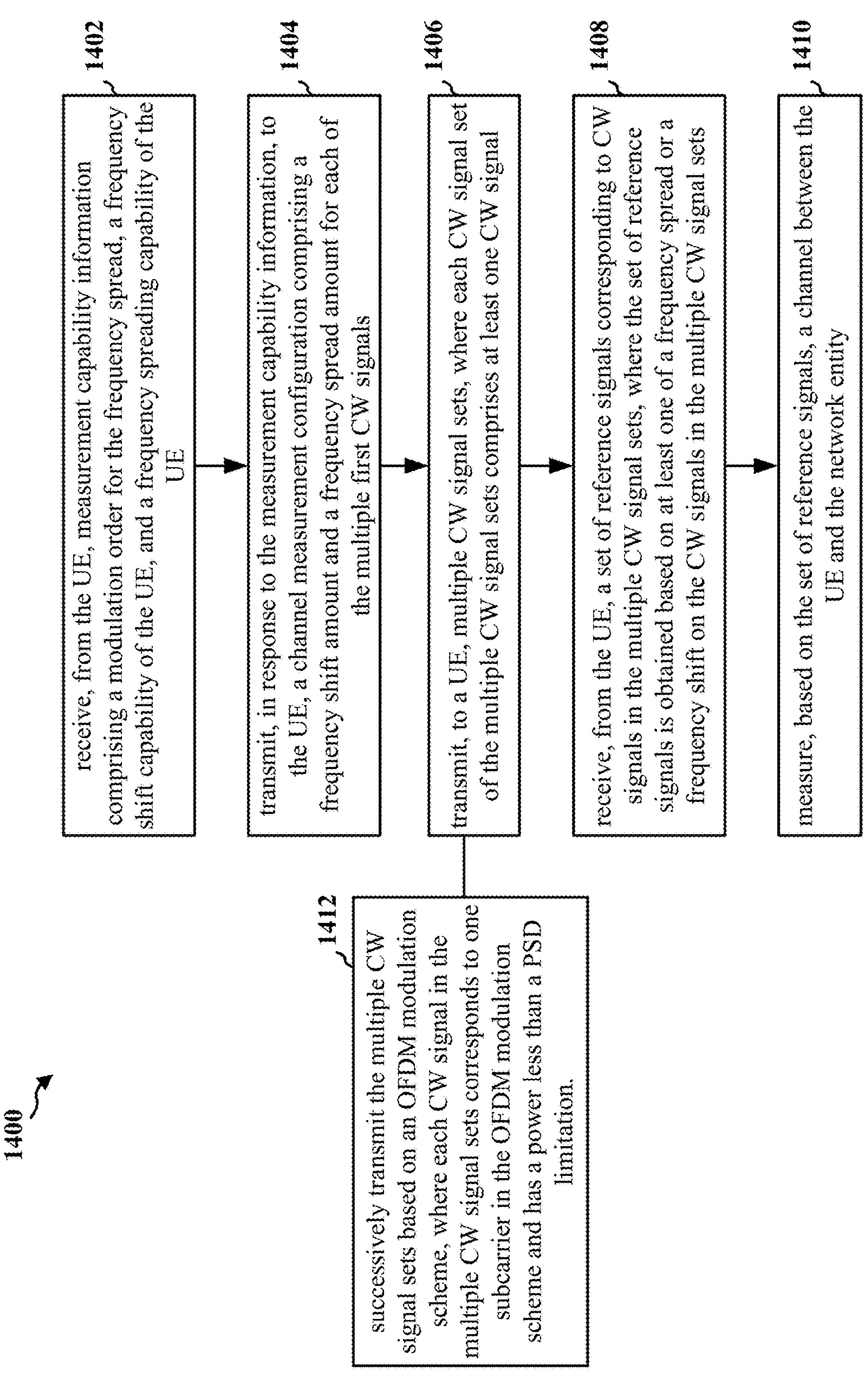
FIG. 14 is a flowchart illustrating methods of wireless communication at a network entity in accordance with various aspects of the present disclosure.

FIG. 14 is a flowchart 1400 illustrating methods of wireless communication at a network entity in accordance with various aspects of the present disclosure. The method may be performed by a network entity. The network entity may be a base station, or a component of a base station, in the access network of FIG. 1, a core network component, or an RFID reader device in an RFID system (e.g., base station 102, 310; network entity 1004; RFID reader device A 602, 702, 802; or the network entity 1502 in the hardware implementation of FIG. 15). The method allows for improved channel estimation while adhering to the PSD limitations and overcoming the challenges posed by distance and path loss. By utilizing multiple measurements of narrow bands and adjusting the spread bandwidth accordingly. RFID systems can achieve more accurate channel estimations, leading to enhanced performance in various operating conditions.

As shown in FIG. 14, at 1406, the network entity may transmit, to a UE, multiple CW signal sets, where each CW signal set of the multiple CW signal sets may include at least one CW signal. The UE may be the UE 104, 350, 1002, RFID tag 604, 704, 804, or the apparatus 1504 in the hardware implementation of FIG. 15. FIGS. 6, 7, 8, 9, and 10 illustrate various aspects of the steps in connection with flowchart 1400. For example, referring to FIG. 10, the network entity 1004 may transmit, at 1012, to a UE 1002, multiple CW signal sets. Referring to FIGS. 6, 7, and 8, the network entity (reader device A 602, 702, 802) may transmit multiple CW signal sets (610, 710, 810) to the UE (tag 604, 704, 804). In some aspects, 1406 may be performed by the backscatter link channel estimation component 199.

At 1408, the network entity may receive, from the UE, a set of reference signals corresponding to CW signals in the multiple CW signal sets. The set of reference signals may be obtained based on at least one of a frequency spread or a frequency shift on the CW signals in the multiple CW signal sets. For example, referring to FIG. 10, the network entity 1004 may receive, at 1016, from the UE 1002, the set of reference signals corresponding to the multiple CW signal sets. In some aspects, 1408 may be performed by the backscatter link channel estimation component 199.

At 1410, the network entity may measure, based on the set of reference signals, a channel between the UE and the network entity. For example, referring to FIG. 10, the network entity 1004 may measure, at 1018, based on the set of reference signals (received at 1016), a channel between the UE 1002 and the network entity 1004. In some aspects, 1410 may be performed by the backscatter link channel estimation component 199.

In some aspects, at 1412, to transmit the multiple CW signal sets, the network entity may be configured to: successively transmit the multiple CW signal sets based on an OFDM modulation scheme. Each CW signal in the multiple CW signal sets may correspond to one subcarrier in the OFDM modulation scheme and has a power less than a PSD limitation. For example, referring to FIG. 10, when transmitting the multiple CW signal sets at 1012, the network entity 1004 may successively transmit the multiple CW signal sets based on an OFDM modulation scheme, and each CW signal in the multiple CW signal sets may correspond to one subcarrier in the OFDM modulation scheme and has a power less than a PSD limitation.

In some aspects, each CW signal set of the multiple CW signal sets may include one first CW signal of multiple first CW signals corresponding to a first frequency band in a frequency domain, and the set of reference signals may be based on the frequency spread and the frequency shift on each first CW signal in the multiple CW signal sets. For example, referring to FIG. 6, each CW signal set of the multiple CW signal sets may include one first CW signal (TX signal 610) of multiple first CW signals corresponding to a first frequency band in a frequency domain, and the set of reference signals (signals 630) may be based on the frequency spread and the frequency shift on each first CW signal in the multiple CW signal sets.

In some aspects, the set of reference signals may cover a measurement frequency range for the measurement of the channel in the frequency domain. For example, referring to FIG. 6, the set of reference signals (signals 630, including frequency shifted signals at $f_1, \ldots, f_5$) may cover a measurement frequency range for the measurement of the channel in the frequency domain.

In some aspects, each reference signal of the set of reference signals may correspond to a reference frequency band in the frequency domain, and each reference frequency band corresponding to the set of reference signals may be approximately equally spaced over the measurement frequency range. For example, referring to FIG. 6, each reference frequency band corresponding to the set of reference signals may be approximately equally spaced over the measurement frequency range (the frequency bands corresponding to signals at $f_1, \ldots, f_5$ may be approximately equally spaced).

At 1402, the network entity may receive, from the UE, measurement capability information including a modulation order for the frequency spread, a frequency shift capability of the UE, and a frequency spread capability of the UE. For example, referring to FIG. 10, the network entity 1004 may receive, at 1008, from the UE 1002, measurement capability information including a modulation order for the frequency spread, a frequency shift capability of the UE 1002, and a frequency spread capability of the UE 1002. In some aspects, 1402 may be performed by the backscatter link channel estimation component 199.

At 1404, the network entity may transmit, in response to the measurement capability information, to the UE, a channel measurement configuration including a frequency shift amount and a frequency spread amount for each of the multiple first CW signals. For example, referring to FIG. 10, the network entity 1004 may transmit, at 1010, in response to the measurement capability information, to the UE 1002, a channel measurement configuration including a frequency shift amount and a frequency spread amount for each of the multiple first CW signals. In some aspects, 1404 may be performed by the backscatter link channel estimation component 199.

In some aspects, the channel measurement configuration may include the same frequency shift amount and the same frequency spread amount for two or more first CW signals of the multiple first CW signals. For example, referring to FIG. 10, the channel measurement configuration (transmitted at 1010) may include the same frequency shift amount and the same frequency spread amount for two or more first CW signals of the multiple first CW signals.

In some aspects, to transmit the multiple CW signal sets, the network entity may be configured to transmit a first CW signal set including multiple CW signals, and transmit a second CW signal set including the same multiple CW signals as the first CW signal set. The CW signals may respectively correspond to different frequency bands in a frequency domain, and the set of reference signals may be based on the frequency spread on each CW signal of the first CW signal set, and the frequency spread and the frequency shift on each CW signal of the second CW signal set. For example, referring to FIG. 8, the network entity (reader device A 802) may transmit a first CW signal set (TX signal 810) including multiple CW signals (signals at $f_0$ and $f_1$), and transmit a second CW signal set including the same multiple CW signals as the first CW signal set. The CW signals may respectively correspond to different frequency bands ($f_0$ and $f_1$) in a frequency domain. The set of reference signals (tag output signals 830) may be based on the frequency spread on each CW signal of the first CW signal set, and the frequency spread and the frequency shift on each CW signal of the second CW signal set.

In some aspects, a frequency shift amount for the frequency shift on the second CW signal set may be based on a frequency gap between a first CW signal and a second CW signal in the second CW signal set. For example, referring to FIG. 8, The frequency shift amount may be based on a frequency gap between signals at $f_0$ and $f_1$.

In some aspects, to transmit the multiple CW signal sets, the network entity may be configured to transmit a first CW signal set including multiple CW signals with a frequency interval between adjacent CW signals of the multiple CW signals in a frequency domain, and transmit a second CW signal set including the same multiple CW signals as the first CW signal set. The multiple CW signals respectively correspond to different frequency bands in the frequency domain, and the set of reference signals may be based on the frequency shift by a first frequency shift amount on each CW signal of the first CW signal set and based on the frequency shift by a second frequency shift amount on each CW signal of the second CW signal set. For example, referring to FIG. 9, the network entity may transmit a first CW signal set (transmitted CSI-RS 902) including multiple CW signals with a frequency interval (Δf) between adjacent CW signals of the multiple CW signals in a frequency domain, and transmit a second CW signal set including the same multiple CW signals as the first CW signal set. The multiple CW signals respectively correspond to different frequency bands in the frequency domain, and the set of reference signals may be based on the frequency shift by a first frequency shift amount ($f_0$) on each CW signal of the first CW signal set and based on the frequency shift by a second frequency shift amount ($f_0+\Delta f$) on each CW signal of the second CW signal set.

In some aspects, the difference between the first frequency shift amount and the second frequency shift amount may be approximately equal to the frequency interval. For example, referring to FIG. 9, the difference between the first frequency shift amount ($f_0$) and the second frequency shift amount ($f_0+\Delta f$) may be approximately equal to the frequency interval ($\Delta f$).

In some aspects, the difference between the first frequency shift amount and the second frequency shift amount may be approximately equal to a multiplication of the frequency interval with a coefficient. For example, referring to FIG. 9, For example, referring to FIG. 9, in some examples, the difference between the first frequency shift amount ($f_0$) and the second frequency shift amount ($f_0+k\Delta f$) may be approximately equal to a multiplication of the frequency interval ($\Delta f$) with a coefficient (k).

Figure 15:
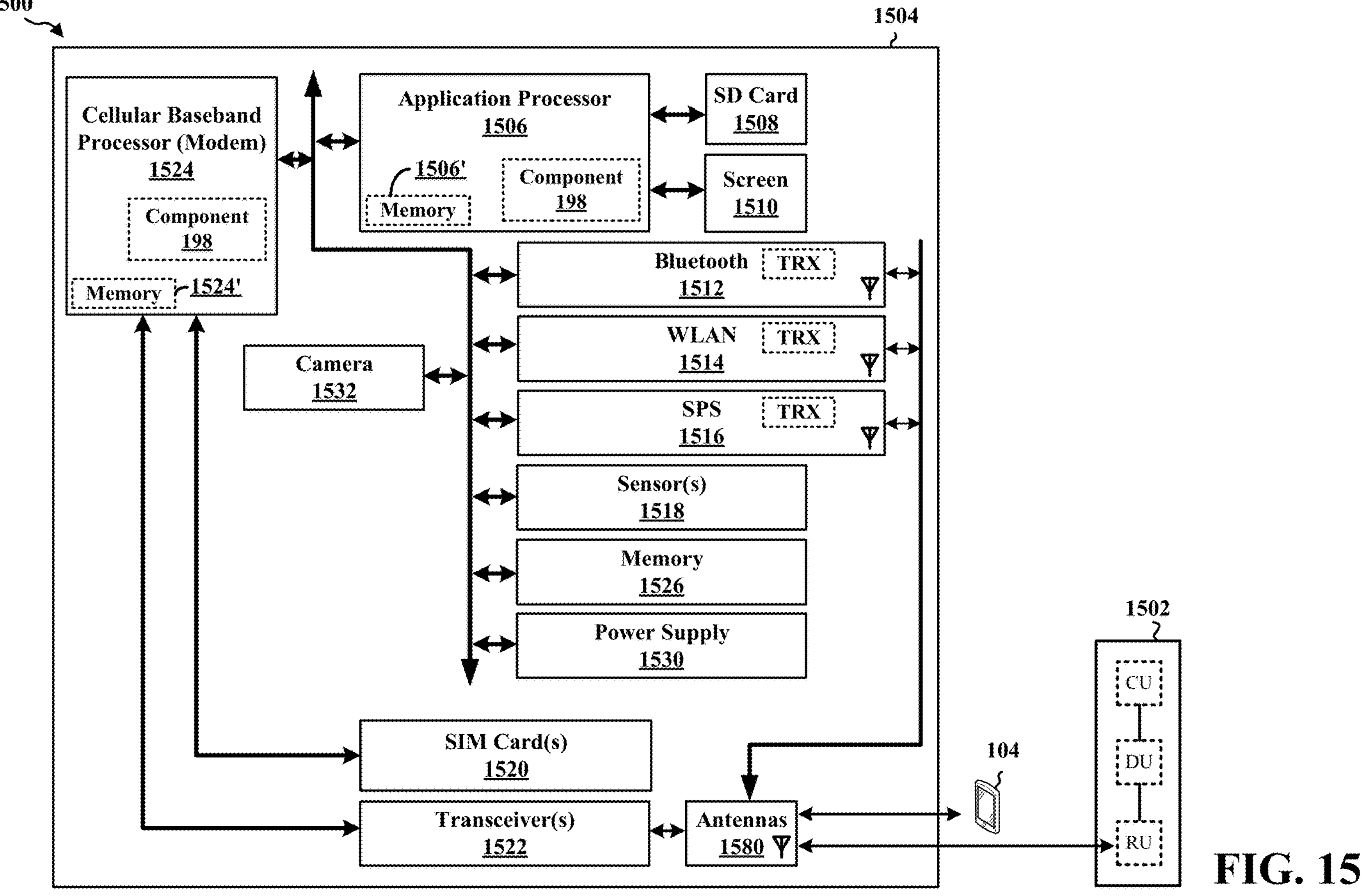
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 may be configured to receive, from a first reader device, multiple CW signal sets, where each CW signal set of the multiple CW signal sets includes at least one CW signal; generate a set of reference signals corresponding to CW signals in the multiple CW signal sets, where the set of reference signals is generated based on at least one of a frequency spread or a frequency shift on the CW signals in the multiple CW signal sets; and transmit, to the first reader device or a second reader device different from the first reader device, the set of reference signals corresponding to the multiple CW signal sets for a measurement of a channel between the UE and the first reader device or between the UE and the second reader device. The component 198 may be further configured to perform any of the aspects described in connection with the flowcharts in FIG. 11 and FIG. 12, and/or performed by the UE 1002 in FIG. 10. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving, from a first reader device, multiple CW signal sets, where each CW signal set of the multiple CW signal sets includes at least one CW signal, means for generating a set of reference signals corresponding to CW signals in the multiple CW signal sets, where the set of reference signals is generated based on at least one of a frequency spread or a frequency shift on the CW signals in the multiple CW signal sets, and means for transmitting, to the first reader device or a second reader device different from the first reader device, the set of reference signals corresponding to the multiple CW signal sets for a measurement of a channel between the UE and the first reader device or between the UE and the second reader device. The apparatus 1504 may further include means for performing any of the aspects described in connection with the flowcharts in FIG. 11 and FIG. 12, and/or aspects performed by the UE 1002 in FIG. 10. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
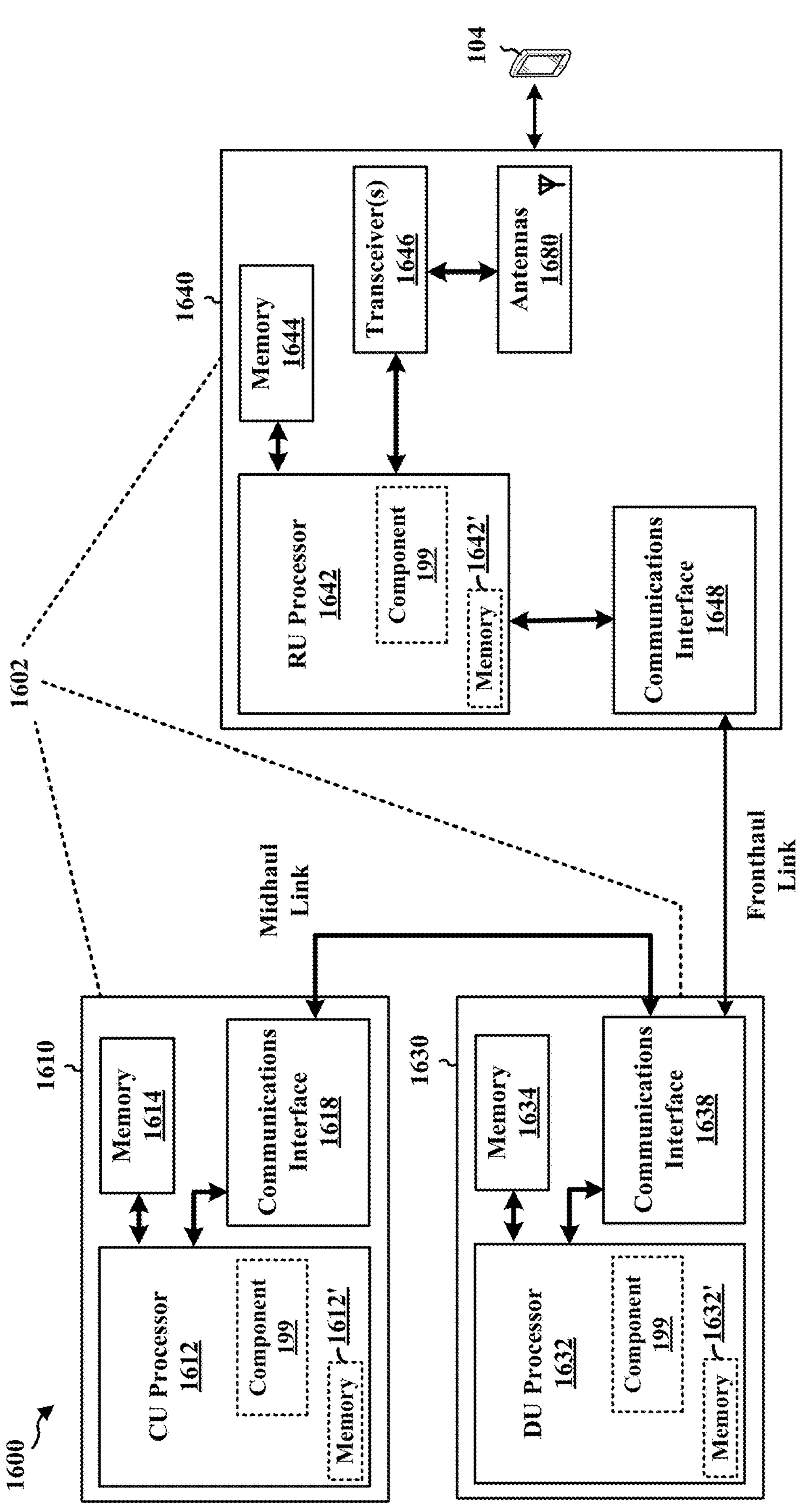
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, to a UE, multiple CW signal sets, where each CW signal set of the multiple CW signal sets includes at least one CW signal; receive, from the UE, a set of reference signals corresponding to CW signals in the multiple CW signal sets, where the set of reference signals is obtained based on at least one of a frequency spread or a frequency shift on the CW signals in the multiple CW signal sets; and measure, based on the set of reference signals, a channel between the UE and the network entity. The component 199 may be further configured to perform any of the aspects described in connection with the flowcharts in FIG. 13 and FIG. 14, and/or performed by the network entity 1004 in FIG. 10. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for transmitting, to a UE, multiple CW signal sets, where each CW signal set of the multiple CW signal sets includes at least one CW signal, means for receiving, from the UE, a set of reference signals corresponding to CW signals in the multiple CW signal sets, where the set of reference signals is obtained based on at least one of a frequency spread or a frequency shift on the CW signals in the multiple CW signal sets, and means for measuring, based on the set of reference signals, a channel between the UE and the network entity. The network entity 1602 may further include means for performing any of the aspects described in connection with the flowcharts in FIG. 13 and FIG. 14, and/or aspects performed by the network entity 1004 in FIG. 10. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a first reader device, multiple CW signal sets, where each CW signal set of the multiple CW signal sets includes at least one CW signal; generating a set of reference signals corresponding to CW signals in the multiple CW signal sets, where the set of reference signals is generated based on at least one of a frequency spread or a frequency shift on the CW signals in the multiple CW signal sets; and transmitting, to the first reader device or a second reader device different from the first reader device, the set of reference signals corresponding to the multiple CW signal sets for a measurement of a channel between the UE and the first reader device or between the UE and the second reader device. The method allows for improved channel estimation while adhering to the PSD limitations and overcoming the challenges posed by distance and path loss. By utilizing multiple measurements of narrow bands and adjusting the spread bandwidth accordingly, RFID systems can achieve more accurate channel estimations, leading to enhanced performance in various operating conditions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include receiving, from a first reader device, multiple CW signal sets, where each CW signal set of the multiple CW signal sets includes at least one CW signal; generating a set of reference signals corresponding to CW signals in the multiple CW signal sets, where the set of reference signals is generated based on at least one of a frequency spread or a frequency shift on the CW signals in the multiple CW signal sets; and transmitting, to the first reader device or a second reader device different from the first reader device, the set of reference signals corresponding to the multiple CW signal sets for a measurement of a channel between the UE and the first reader device or between the UE and the second reader device.

Aspect 2 is the method of aspect 1, where receiving the multiple CW signal sets may include: successively receiving the multiple CW signal sets based on an OFDM modulation scheme, and each CW signal in the multiple CW signal sets may correspond to one subcarrier in the OFDM modulation scheme and has a power less than a PSD limitation.

Aspect 3 is the method of aspect 2, where each CW signal set of the multiple CW signal sets may include one first CW signal of multiple first CW signals corresponding to a first frequency band in a frequency domain, and generating the set of reference signals corresponding to the CW signals in the multiple CW signal sets may include: performing the frequency spread on each received first CW signal to obtain a first spread signal, where the first spread signal corresponds to a second frequency band wider than the first frequency band in the frequency domain, and performing the frequency shift on each first spread signal corresponding to the multiple first CW signals to obtain the set of reference signals, where the amount of the frequency shift is different for each first CW signal.

Aspect 4 is the method of aspect 3, where the set of reference signals may cover a measurement frequency range for the measurement of the channel in the frequency domain.

Aspect 5 is the method of aspect 4, where each reference signal of the set of reference signals may correspond to a reference frequency band in the frequency domain, and each reference frequency band corresponding to the set of reference signals may be approximately equally spaced over the measurement frequency range.

Aspect 6 is the method of any of aspects 3 to 5, where each first spread signal may be approximately uniformly distributed over the second frequency band in the frequency domain.

Aspect 7 is the method of aspect 6, where performing the frequency spread on each received first CW signal may include: performing the frequency spread on each received first CW signal based on the ZC sequence in a time domain.

Aspect 8 is the method of aspect 7, where performing the frequency spread on each received first CW signal based on the ZC sequence may include: generating a backscatter modulator with a load, where the load corresponds to an order of the backscatter modulator approximating the ZC sequence; and performing the frequency spread on each received first CW signal based on the backscatter modulator.

Aspect 9 is the method of any of aspects 3 to 8, where the method may further include transmitting, to the first reader device, measurement capability information including a modulation order related to the frequency spread, a frequency shift capability of the UE, and a frequency spread capability of the UE; and receiving, from the first reader device, a channel measurement configuration including a frequency shift amount and a frequency spread amount for each of the multiple first CW signals.

Aspect 10 is the method of aspect 9, where two or more first CW signals of the multiple first CW signals may have the same frequency shift amount and the same frequency spread amount.

Aspect 11 is the method of any of aspects 2 to 10, where receiving the multiple CW signal sets may include: receiving a first CW signal set including multiple CW signals, and receiving a second CW signal set including the same multiple CW signals as the first CW signal set. The CW signals may respectively correspond to different frequency bands, and generating the set of reference signals corresponding to the CW signals in the multiple CW signal sets may include: performing the frequency spread on each CW signal of the first CW signal set to obtain a first set of reference signals, where each of the first set of reference signals respectively corresponds to first reference frequency bands not overlapping with each other, perform the frequency spread on each CW signal of the second CW signal set to obtain multiple spread signals respectively corresponding to the multiple CW signals in the second CW signal set, where spread signals in the multiple spread signals respectively correspond to spread frequency bands not overlapping with each other, and performing the frequency shift on the multiple spread signals to obtain a second set of reference signals, where the set of reference signals includes the first set of reference signals and the second set of reference signals.

Aspect 12 is the method of aspect 11, where performing the frequency shift on the multiple spread signals may include: performing the frequency shift on the multiple spread signals based on a frequency shift amount. The frequency shift amount may be based on a frequency gap between a first CW signal and a second CW signal in the second CW signal set.

Aspect 13 is the method of any of aspects 2 to 12, where receiving the multiple CW signal sets may include: receiving a first CW signal set including multiple CW signals with a frequency interval between adjacent CW signals of the multiple CW signals in a frequency domain, and receiving a second CW signal set including the same multiple CW signals as the first CW signal set, where the multiple CW signals respectively correspond to different frequency bands in the frequency domain. Generating the set of reference signals corresponding to the CW signals in the multiple CW signal sets may include: performing the frequency shift by a first frequency shift amount on each CW signal of the first CW signal set to obtain a first set of reference signals, and performing the frequency shift by a second frequency shift amount on each CW signal of the second CW signal set to obtain a second set of reference signals. The set of reference signals may include the first set of reference signals and the second set of reference signals.

Aspect 14 is the method of aspect 13, where the difference between the first frequency shift amount and the second frequency shift amount may be approximately equal to the frequency interval.

Aspect 15 is the method of aspect 13, where the difference between the first frequency shift amount and the second frequency shift amount may be approximately equal to a multiplication of the frequency interval with a coefficient.

Aspect 16 is an apparatus for wireless communication at a UE, including: a memory; and at least one processor coupled to the memory and, based at least in part on information stored in the memory, the at least one processor is configured to perform the method of any of aspects 1-15.

Aspect 17 is the apparatus of aspect 16, further including at least one of a transceiver or an antenna coupled to the at least one processor and configured to receive the multiple CW signal sets.

Aspect 18 is an apparatus for wireless communication including means for implementing the method of any of aspects 1-15.

Aspect 19 is a computer-readable medium (e.g., a non-transitory computer-readable medium) storing computer executable code, where the code when executed by a processor causes the processor to implement the method of any of aspects 1-15.

Aspect 20 is a method of wireless communication at a network entity. The method may include transmitting, to a UE, multiple CW signal sets, where each CW signal set of the multiple CW signal sets includes at least one CW signal; receiving, from the UE, a set of reference signals corresponding to CW signals in the multiple CW signal sets, where the set of reference signals is obtained based on at least one of a frequency spread or a frequency shift on the CW signals in the multiple CW signal sets; and measuring, based on the set of reference signals, a channel between the UE and the network entity.

Aspect 21 is the method of aspect 20, where transmitting the multiple CW signal sets may include: successively transmitting the multiple CW signal sets based on an OFDM modulation scheme, and each CW signal in the multiple CW signal sets may correspond to one subcarrier in the OFDM modulation scheme and has a power less than a PSD limitation.

Aspect 22 is the method of aspect 21, where each CW signal set of the multiple CW signal sets may include one first CW signal of multiple first CW signals corresponding to a first frequency band in a frequency domain, and the set of reference signals may be based on the frequency spread and the frequency shift on each first CW signal in the multiple CW signal sets.

Aspect 23 is the method of aspect 22, where the set of reference signals may cover a measurement frequency range for the measurement of the channel in the frequency domain Aspect 24 is the method of aspect 23, where each reference signal of the set of reference signals may correspond to a reference frequency band in the frequency domain, and each reference frequency band corresponding to the set of reference signals may be approximately equally spaced over the measurement frequency range.

Aspect 25 is the method of any of aspects 22 to 24, where the method may further include receiving, from the UE, measurement capability information including a modulation order for the frequency spread, a frequency shift capability of the UE, and a frequency spread capability of the UE; and transmitting, in response to the measurement capability information, to the UE, a channel measurement configuration including a frequency shift amount and a frequency spread amount for each of the multiple first CW signals.

Aspect 26 is the method of aspect 25, where the channel measurement configuration may include the same frequency shift amount and the same frequency spread amount for two or more first CW signals of the multiple first CW signals.

Aspect 27 is the method of any of aspects 21 to 26, where transmitting the multiple CW signal sets may include: transmitting a first CW signal set including multiple CW signals, and transmitting a second CW signal set including the same multiple CW signals as the first CW signal set, where the CW signals respectively correspond to different frequency bands in a frequency domain. The set of reference signals may be based on the frequency spread on each CW signal of the first CW signal set, and the frequency spread and the frequency shift on each CW signal of the second CW signal set.

Aspect 28 is the method of aspect 27, where the frequency shift amount for the frequency shift on the second CW signal set may be based on a frequency gap between a first CW signal and a second CW signal in the second CW signal set.

Aspect 29 is the method of any of aspects 21 to 28, where transmitting the multiple CW signal sets may include: transmitting a first CW signal set including multiple CW signals with a frequency interval between adjacent CW signals of the multiple CW signals in a frequency domain, and transmitting a second CW signal set including the same multiple CW signals as the first CW signal set, where the multiple CW signals respectively correspond to different frequency bands in the frequency domain. The set of reference signals may be based on the frequency shift by a first frequency shift amount on each CW signal of the first CW signal set and based on the frequency shift by a second frequency shift amount on each CW signal of the second CW signal set.

Aspect 30 is the method of aspect 29, where the difference between the first frequency shift amount and the second frequency shift amount may be approximately equal to the frequency interval.

Aspect 31 is the method of aspect 29, where the difference between the first frequency shift amount and the second frequency shift amount may be approximately equal to a multiplication of the frequency interval with a coefficient.

Aspect 32 is an apparatus for wireless communication at a network entity, including: a memory; and at least one processor coupled to the memory and, based at least in part on information stored in the memory, the at least one processor is configured to perform the method of any of aspects 20-31.

Aspect 33 is the apparatus of aspect 32, further including at least one of a transceiver or an antenna coupled to the at least one processor and configured to transmit the multiple CW signal sets.

Aspect 34 is an apparatus for wireless communication including means for implementing the method of any of aspects 20-31.

Aspect 35 is a computer-readable medium (e.g., a non-transitory computer-readable medium) storing computer executable code, where the code when executed by a processor causes the processor to implement the method of any of aspects 20-31.

What is claimed is:

1. An apparatus of wireless communication at a user equipment (UE), comprising:

memory; and at least one processor coupled to the memory and, based at least in part on information stored in the memory, the at least one processor is configured to:

receive, from a first reader device, multiple continuous wave (CW) signal sets, wherein each CW signal set of the multiple CW signal sets comprises at least one CW signal;

generate a set of reference signals corresponding to CW signals in the multiple CW signal sets, wherein the set of reference signals is generated based on a frequency spread and a frequency shift on the CW signals in the multiple CW signal sets; and transmit, to the first reader device or a second reader device different from the first reader device, the set of reference signals corresponding to the multiple CW signal sets for a measurement of a channel between the UE and the first reader device or between the UE and the second reader device, wherein to receive the multiple CW signal sets, the at least one processor is configured to: successively receive the multiple CW signal sets based on an orthogonal frequency division multiplexing (OFDM) modulation scheme, and wherein each CW signal in the multiple CW signal sets corresponds to one subcarrier in the OFDM modulation scheme and has a power less than a power spectrum density (PSD) limitation, wherein each CW signal set of the multiple CW signal sets comprises one first CW signal of multiple first CW signals corresponding to a first frequency band in a frequency domain, and wherein to generate the set of reference signals corresponding to the CW signals in the multiple CW signal sets, the at least one processor is configured to:

perform the frequency spread on each received first CW signal to obtain a first spread signal, wherein the first spread signal corresponds to a second frequency band wider than the first frequency band in the frequency domain, and perform the frequency shift on each first spread signal corresponding to the multiple first CW signals to obtain the set of reference signals, wherein an amount of the frequency shift is different for each first CW signal.

2. The apparatus of claim 1, further comprising a transceiver coupled to the at least one processor, wherein, to receive the multiple CW signal sets, the at least one processor is configured to receive the multiple CW signal sets via the transceiver.

3. The apparatus of claim 1, wherein the set of reference signals covers a measurement frequency range for the measurement of the channel in the frequency domain.

4. The apparatus of claim 3, wherein each reference signal of the set of reference signals corresponds to a reference frequency band in the frequency domain, and wherein each reference frequency band corresponding to the set of reference signals is approximately equally spaced over the measurement frequency range.

5. The apparatus of claim 1, wherein each first spread signal is approximately uniformly distributed over the second frequency band in the frequency domain.

6. The apparatus of claim 5, wherein, to perform the frequency spread on each received first CW signal, the at least one processor is configured to:

perform the frequency spread on each received first CW signal based on a Zadoff-Chu (ZC) sequence in a time domain.

7. The apparatus of claim 6, wherein, to perform the frequency spread on each received first CW signal based on the ZC sequence, the at least one processor is configured to:

generate a backscatter modulator with a load, wherein the load corresponds to an order of the backscatter modulator approximating the ZC sequence; and perform the frequency spread on each received first CW signal based on the backscatter modulator.

8. The apparatus of claim 1, wherein the at least one processor is further configured to:

transmit, to the first reader device, measurement capability information comprising a modulation order related to the frequency spread, a frequency shift capability of the UE, and a frequency spread capability of the UE; and receive, from the first reader device, a channel measurement configuration comprising a frequency shift amount and a frequency spread amount for each of the multiple first CW signals.

9. The apparatus of claim 8, wherein two or more first CW signals of the multiple first CW signals have a same frequency shift amount and a same frequency spread amount.

10. The apparatus of claim 2, wherein, to receive the multiple CW signal sets, the at least one processor is configured to:

receive a first CW signal set comprising multiple CW signals, and receive a second CW signal set comprising same multiple CW signals as the first CW signal set, wherein the CW signals respectively correspond to different frequency bands, and wherein, to generate the set of reference signals corresponding to the CW signals in the multiple CW signal sets, the at least one processor is configured to:

perform the frequency spread on each CW signal of the first CW signal set to obtain a first set of reference signals, wherein each of the first set of reference signals respectively corresponds to first reference frequency bands not overlapping with each other, perform the frequency spread on each CW signal of the second CW signal set to obtain multiple spread signals respectively corresponding to the multiple CW signals in the second CW signal set, wherein spread signals in the multiple spread signals respectively correspond to spread frequency bands not overlapping with each other, and perform the frequency shift on the multiple spread signals to obtain a second set of reference signals, wherein the set of reference signals includes the first set of reference signals and the second set of reference signals.

11. The apparatus of claim 10, wherein, to perform the frequency shift on the multiple spread signals, the at least one processor is configured to:

perform the frequency shift on the multiple spread signals based on a frequency shift amount, wherein the frequency shift amount is based on a frequency gap between a first CW signal and a second CW signal in the second CW signal set.

12. The apparatus of claim 1, wherein, to receive the multiple CW signal sets, the at least one processor is configured to:

receive a first CW signal set comprising multiple CW signals with a frequency interval between adjacent CW signals of the multiple CW signals in the frequency domain, and receive a second CW signal set comprising same multiple CW signals as the first CW signal set, wherein the multiple CW signals respectively correspond to different frequency bands in the frequency domain, and wherein, to generate the set of reference signals corresponding to the CW signals in the multiple CW signal sets, the at least one processor is configured to:

perform the frequency shift by a first frequency shift amount on each CW signal of the first CW signal set to obtain a first set of reference signals, and perform the frequency shift by a second frequency shift amount on each CW signal of the second CW signal set to obtain a second set of reference signals, wherein the set of reference signals includes the first set of reference signals and the second set of reference signals.

13. The apparatus of claim 12, wherein a difference between the first frequency shift amount and the second frequency shift amount is approximately equal to the frequency interval.

14. The apparatus of claim 12, wherein a difference between the first frequency shift amount and the second frequency shift amount is approximately equal to a multiplication of the frequency interval with a coefficient.

15. An apparatus of wireless communication at a network entity, comprising:

memory; and at least one processor coupled to the memory and, based at least in part on information stored in the memory, the at least one processor is configured to:

transmit, to a user equipment (UE), multiple continuous wave (CW) signal sets, wherein each CW signal set of the multiple CW signal sets comprises at least one CW signal;

receive, from the UE, a set of reference signals corresponding to CW signals in the multiple CW signal sets, wherein the set of reference signals is obtained based on a frequency spread and a frequency shift on the CW signals in the multiple CW signal sets; and measure, based on the set of reference signals, a channel between the UE and the network entity, wherein to transmit the multiple CW signal sets, the at least one processor is configured to:

successively transmit the multiple CW signal sets based on an orthogonal frequency division multiplexing (OFDM) modulation scheme, and wherein each CW signal in the multiple CW signal sets corresponds to one subcarrier in the OFDM modulation scheme and has a power less than a power spectrum density (PSD) limitation, wherein each CW signal set of the multiple CW signal sets comprises one first CW signal of multiple first CW signals corresponding to a first frequency band in a frequency domain, and the set of reference signals is based on the frequency spread and the frequency shift on each first CW signal in the multiple CW signal sets, and wherein the set of reference signals is obtained based on the frequency shift on each first spread signal corresponding to each first CW signals of the multiple first CW signals, wherein an amount of the frequency shift is different for each first CW signal, and wherein the first spread signal corresponding to each first CW signal is based on the frequency spread on each first CW signal, wherein the first spread signal corresponds to a second frequency band wider than the first frequency band in the frequency domain.

16. The apparatus of claim 15, further comprising a transceiver coupled to the at least one processor, wherein, to transmit the multiple CW signal sets, the at least one processor is configured to transmit the multiple CW signal sets via the transceiver.

17. The apparatus of claim 15, wherein the set of reference signals covers a measurement frequency range for the measurement of the channel in the frequency domain.

18. The apparatus of claim 17, wherein each reference signal of the set of reference signals corresponds to a reference frequency band in the frequency domain, and wherein each reference frequency band corresponding to the set of reference signals is approximately equally spaced over the measurement frequency range.

19. The apparatus of claim 15, wherein the at least one processor is further configured to:

receive, from the UE, measurement capability information comprising a modulation order for the frequency spread, a frequency shift capability of the UE, and a frequency spread capability of the UE; and transmit, in response to the measurement capability information, to the UE, a channel measurement configuration comprising a frequency shift amount and a frequency spread amount for each of the multiple first CW signals.

20. The apparatus of claim 19, wherein the channel measurement configuration includes a same frequency shift amount and a same frequency spread amount for two or more first CW signals of the multiple first CW signals.

21. The apparatus of claim 16, wherein, to transmit the multiple CW signal sets, the at least one processor is configured to:

transmit a first CW signal set comprising multiple CW signals, and transmit a second CW signal set comprising same multiple CW signals as the first CW signal set, wherein the CW signals respectively correspond to different frequency bands in the frequency domain, wherein the set of reference signals is based on the frequency spread on each CW signal of the first CW signal set, and the frequency spread and the frequency shift on each CW signal of the second CW signal set.

22. The apparatus of claim 21, wherein a frequency shift amount for the frequency shift on the second CW signal set is based on a frequency gap between a first CW signal and a second CW signal in the second CW signal set.

23. The apparatus of claim 16, wherein, to transmit the multiple CW signal sets, the at least one processor is configured to:

transmit a first CW signal set comprising multiple CW signals with a frequency interval between adjacent CW signals of the multiple CW signals in the frequency domain, and transmit a second CW signal set comprising same multiple CW signals as the first CW signal set, wherein the multiple CW signals respectively correspond to different frequency bands in the frequency domain, wherein the set of reference signals is based on the frequency shift by a first frequency shift amount on each CW signal of the first CW signal set and based on the frequency shift by a second frequency shift amount on each CW signal of the second CW signal set.

24. The apparatus of claim 23, wherein a difference between the first frequency shift amount and the second frequency shift amount is approximately equal to the frequency interval.

25. The apparatus of claim 23, wherein a difference between the first frequency shift amount and the second frequency shift amount is approximately equal to a multiplication of the frequency interval with a coefficient.

26. A method of wireless communication at a user equipment (UE), comprising:

receiving, from a first reader device, multiple continuous wave (CW) signal sets, wherein each CW signal set of the multiple CW signal sets comprises at least one CW signal;

generating a set of reference signals corresponding to CW signals in the multiple CW signal sets, wherein the set of reference signals is generated based on a frequency spread and a frequency shift on the CW signals in the multiple CW signal sets; and transmitting, to the first reader device or a second reader device different from the first reader device, the set of reference signals corresponding to the multiple CW signal sets for a measurement of a channel between the UE and the first reader device or between the UE and the second reader device, wherein receiving the multiple CW signal sets comprises:

successively receiving the multiple CW signal sets based on an orthogonal frequency division multiplexing (OFDM) modulation scheme, and wherein each CW signal in the multiple CW signal sets corresponds to one subcarrier in the OFDM modulation scheme and has a power less than a power spectrum density (PSD) limitation, wherein each CW signal set of the multiple CW signal sets comprises one first CW signal of multiple first CW signals corresponding to a first frequency band in a frequency domain, and wherein generating the set of reference signals corresponding to the CW signals in the multiple CW signal sets comprises:

performing the frequency spread on each received first CW signal to obtain a first spread signal, wherein the first spread signal corresponds to a second frequency band wider than the first frequency band in the frequency domain, and performing the frequency shift on each first spread signal corresponding to the multiple first CW signals to obtain the set of reference signals, wherein an amount of the frequency shift is different for each first CW signal.

27. A method of wireless communication at a network entity, comprising:

transmitting, to a user equipment (UE), multiple continuous wave (CW) signal sets, wherein each CW signal set of the multiple CW signal sets comprises at least one CW signal;

receiving, from the UE, a set of reference signals corresponding to CW signals in the multiple CW signal sets, wherein the set of reference signals is obtained based on a frequency spread and a frequency shift on the CW signals in the multiple CW signal sets; and measuring, based on the set of reference signals, a channel between the UE and the network entity, wherein transmitting the multiple CW signal sets comprises:

successively transmitting the multiple CW signal sets based on an orthogonal frequency division multiplexing (OFDM) modulation scheme, and wherein each CW signal in the multiple CW signal sets corresponds to one subcarrier in the OFDM modulation scheme and has a power less than a power spectrum density (PSD) limitation, wherein each CW signal set of the multiple CW signal sets comprises one first CW signal of multiple first CW signals corresponding to a first frequency band in a frequency domain, and the set of reference signals is based on the frequency spread and the frequency shift on each first CW signal in the multiple CW signal sets, and wherein the set of reference signals is obtained based on the frequency shift on each first spread signal corresponding to each first CW signals of the multiple first CW signals, wherein an amount of the frequency shift is different for each first CW signal, and wherein the first spread signal corresponding to each first CW signal is based on the frequency spread on each first CW signal, wherein the first spread signal corresponds to a second frequency band wider than the first frequency band in the frequency domain.

* * * * *